(12) United States Patent
Honda et al.

(10) Patent No.: US 6,270,832 B2
(45) Date of Patent: Aug. 7, 2001

(54) METHOD FOR MANUFACTURING A LAYERED PRODUCT

(75) Inventors: Kazuyoshi Honda, Takatsuki; Noriyasu Echigo, Kobe; Masaru Odagiri, Kawanishi; Nobuki Sunagare, Matue, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/257,109

(22) Filed: Feb. 25, 1999

(30) Foreign Application Priority Data

Feb. 27, 1998 (JP) .................................................. 10-046551

(51) Int. Cl.⁷ .................................................. C23C 14/30
(52) U.S. Cl. .............................. 427/9; 427/559; 427/585; 427/250; 427/282; 427/299; 427/300; 134/6; 134/32; 134/33
(58) Field of Search .............................. 427/9, 585, 596, 427/559, 299, 300, 250, 282; 134/6, 32, 33

(56) References Cited

U.S. PATENT DOCUMENTS 5,699,584 * 12/1997 Wieloch et al. .

FOREIGN PATENT DOCUMENTS

| 0 340 935 | 11/1989 | (EP) . |
| 0 808 667 | 11/1997 | (EP) . |
| 808667 * | 11/1997 | (EP) . |

OTHER PUBLICATIONS

European Search Report dated Aug. 12, 2000.

* cited by examiner

Primary Examiner—Timothy Meeks
(74) Attorney, Agent, or Firm—Merchant & Gould P.C.

(57) ABSTRACT

Before forming resin layers and metal thin film layers on a rotating supporting base, a belt-shaped object is run over the supporting base to remove foreign particles adhering to the supporting base. After a resin layer and a metal thin film layer are formed on the belt-shaped object and their formation conditions are optimized, the belt-shaped object is removed, and subsequently a layered product is formed on the supporting base. Thus, foreign objects adhering to the supporting base can be removed, and resin layers and metal thin film layers can be formed as desired.

39 Claims, 13 Drawing Sheets

METHOD FOR MANUFACTURING A LAYERED PRODUCT

FIELD OF THE INVENTION

The present invention relates to a method for manufacturing a layered product comprising resin layers and metal thin film layers. More specifically, the present invention relates to manufacturing a layered product by alternately depositing resin layers and metal thin film layers on a rotating supporting base.

BACKGROUND OF THE INVENTION

A method for manufacturing a layered product having alternating resin layers and metal thin film layers, wherein depositing a resin layer and depositing a metal thin film layer are performed one after the other, and repeatedly applied to a rotating supporting base, is known, for example, from European Patent Application EP 0 808 667.

Referring to the drawings, the following is an example of a method for manufacturing a layered product comprising resin layers and metal thin film layers.

FIG. 12 is a cross-sectional drawing schematically showing an example of a manufacturing apparatus using a conventional method for manufacturing a layered product.

An apparatus 900 for manufacturing a layered product comprises a rotatable cylindrical can roller 910 inside a vacuum tank 901, an apparatus 920 for forming a resin layer arranged near the perimeter of the can roller 910, a resin curing device 940, and an apparatus 930 for forming a metal thin film. The reduced pressure inside the vacuum tank 901 is sustained by a vacuum pump 902.

Liquid resin material is supplied to the apparatus 920 for forming a resin layer with a resin-material supply tube 921. The fluid flow can be regulated with a fluid-flow regulation valve 922. The fluid resin material is accumulated in a heating container 923, heated, evaporated, and deposited on the surface of a heating roll 925, which rotates in the direction indicated by arrow 924. Then, it is again evaporated, and deposited on the surface of the can roller 910, which rotates in the direction indicated by arrow 911.

Since the can roller 910 has been cooled below the condensation point of the resin material, the deposited resin material is cooled by the surface of the can roller 910, so that a solid resin layer made of the resin material is formed.

The resulting resin layer is cured by irradiation of UV light from the resin curing device 940.

Then, the apparatus 930 for forming a metal thin film forms an aluminum thin film on the surface of the resin layer by vapor deposition.

Thus, rotating the can roller 910, the apparatus 920 for forming a resin layer and the apparatus 930 for forming a metal thin film form resin layers alternating with metal thin film layers on the circumferential surface of the can roller 910, and a layered product comprising resin layers and metal thin film layers is manufactured.

Considerable R&D efforts have been invested in this method, since with this method, a resin layer thickness of about 0.1–1 μm, and a metal thin film layer thickness of about 50 nm can be attained. A compact capacitor with large capacitance can be manufactured with low production costs when the obtained layered product is applied to a capacitor with the resin layers as the dielectric layers.

However, when the above method is reduced to practice, a number of problems remain to be solved.

First, as the thicknesses of the resin layer and the metal thin film layer become very thin, the existence of solid foreign particles in the layered product cannot be ignored anymore. Small solid foreign particles adhering to the surface of the can roller 910 are particularly abundant in the layered product that is the first one manufactured after closing the vacuum tank 901, which had been opened for performing adjustments on the apparatuses inside it. FIG. 13 is a cross-sectional drawing, showing schematically the layering of resin layers 951 and metal thin film layers 952 when a solid foreign particle 961 adheres to the surface of the can roller 910. As is shown in this drawing, when the layer thickness is thin, the relative size of the foreign particle in comparison to the thickness of each layer cannot be ignored, and a protrusion 956 that is bigger than the intruding foreign particle is formed on the surface of the resulting layered product. Moreover, the thicknesses of the resin layer and the metal thin film layer at the portion where the protrusion is formed easily become irregular. Consequently, if the layered product is used, for example, as a capacitor, the withstand voltage of the capacitor decreases due to the presence of portions where the resin films are thinner, and in the worst case, pinholes develop and cause short-circuits. Moreover, when the metal thin film layer becomes too thin, the withstand current of that portion may decrease. It follows that there is a need for a method for manufacturing layered products with reduced chances for the presence of foreign particles.

There are applications for the layered product, where it is especially desirable for the layering thicknesses of the layered product to be precisely as designed. Furthermore, when the metal thin film layer is divided into a plurality of metal thin film layer portions formed on the same resin layer surface by forming insulating regions (also called "margins") where the metal thin film layer is not formed, it is desirable that the position of the insulating regions and their widths be precisely as designed. If the layered product is used as a capacitor for example, the thickness of the resin layers, which function as the dielectric layers, and the position and the widths of the insulating regions, which determine the surface area of the portions that function as the dielectric, have a direct influence on the capacitance of the capacitor. Heretofore, the manufacturing parameters were determined by theoretical calculations or by trial and error. However, since it is very difficult to maintain the manufacturing environment (atmosphere) constant, the resulting layered products are not necessarily identical, even when identical settings are used as manufacturing parameters. Furthermore, there is a limit to the precision with which the actual layering of a thin film can be predicted by theoretical calculations. Consequently, there is a need for a method, wherein, before the layered product is formed, a resin layer and a metal thin film layer, and if necessary insulating regions, are formed, it is checked how well they were formed, optimal manufacturing conditions are determined and set on the basis of this check, and the layered product is manufactured subsequently and without modifying environment (atmosphere) and the conditions after their optimization.

SUMMARY OF THE INVENTION

Thus, it is an object of the present invention to provide a method for manufacturing a layered product, comprising the steps of forming a resin layer by deposition of a resin material, and forming a metal thin film layer, which steps are repeated a predetermined number of times on a rotating supporting base, so as to manufacture a layered product comprising resin layers and metal thin film layers, wherein foreign particles adhering to the supporting base can be removed with an easily implementable method.

It is a further object of the present invention to provide a method for manufacturing a layered product as described above, wherein, before the layered product is formed, a resin layer and a metal thin film layer, and if necessary insulating regions, are formed, and the layered product is manufactured subsequently after it is checked how well they were formed.

In order to solve the problems of the prior art and achieve these objects, an inventive method for manufacturing a layered product comprises the steps of forming a resin layer by deposition of a resin material; forming a metal thin film layer; which steps are repeated a predetermined number of times on a rotating supporting base, so as to manufacture a layered product comprising resin layers and metal thin film layers; and before the resin layers and metal thin film layers are formed on the supporting base: running a belt-shaped object over the supporting base; and removing the belt-shaped object.

In accordance with the present invention, it becomes possible to remove foreign particles adhering to the supporting base by sticking them to the belt-shaped object, so that a layered product can be manufactured without the intrusion of foreign particles.

Furthermore, a resin layer and a metal thin film layer, and if necessary an insulating region are formed for trial purposes on the belt-shaped object running over the supporting base, it is checked how well they are formed, and, if necessary, the parameters for their formation are adjusted. After the formation parameters have been adjusted, the belt-shaped object is removed, and a layered object can be formed subsequently on the supporting base. Thus, it becomes possible to manufacture a layered product with the desired layering thicknesses and insulating regions.

DESCRIPTION OF THE PREFERRED EMBODIMENTS

The following is a description of a method for manufacturing a layered product in accordance with the present invention, with reference to the accompanying drawings.

Figure 1:
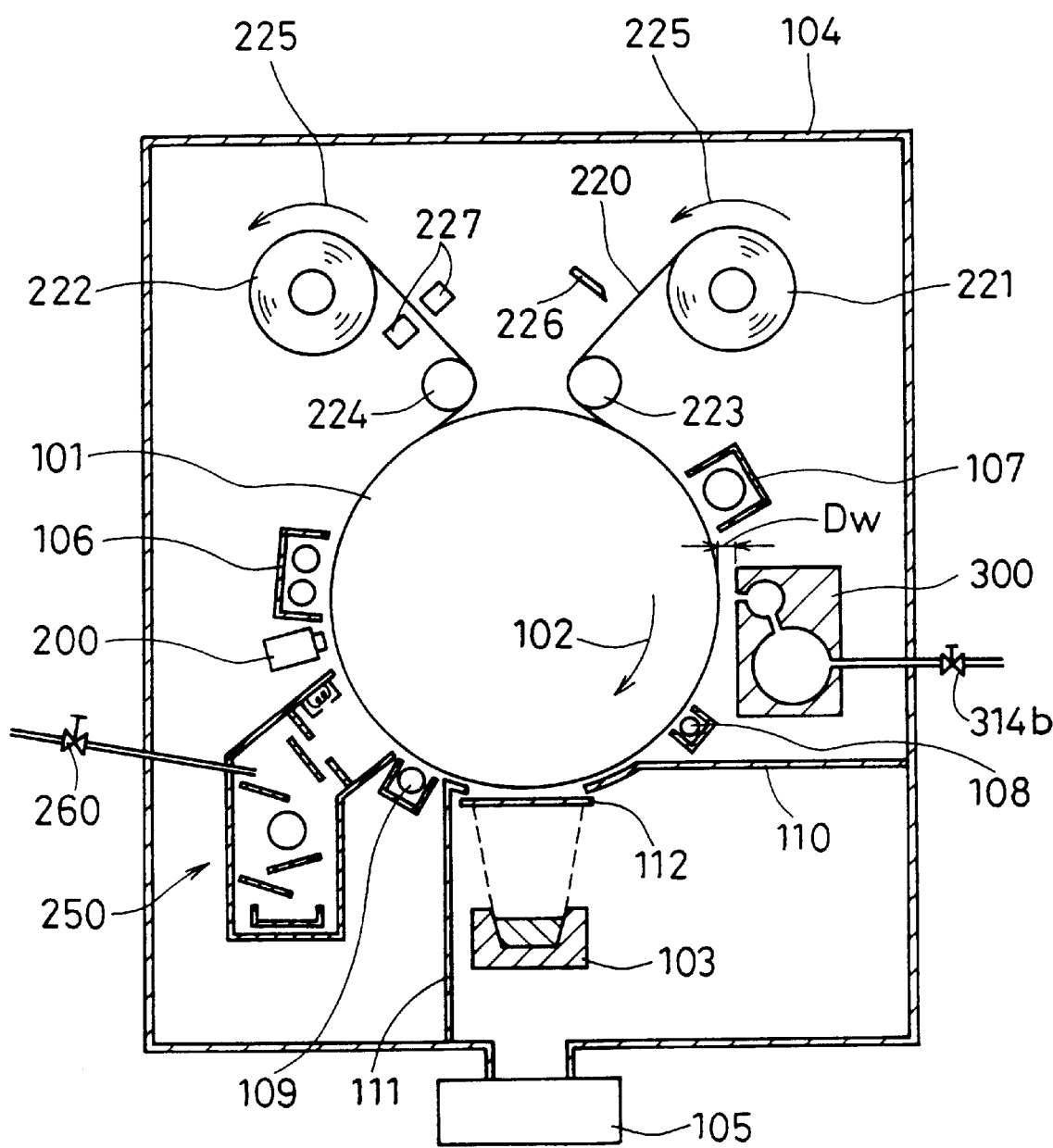
FIG. 1 is a cross-sectional drawing schematically showing an example of a manufacturing apparatus for performing the method for manufacturing a layered product in accordance with the present invention.

FIG. 1 is a cross-sectional drawing schematically showing an embodiment of a manufacturing apparatus for performing the method for manufacturing a layered product in accordance with the present invention.

An apparatus 103 for forming a metal thin film is arranged at a lower portion of a can roller 101, which rotates in direction of arrow 102 with constant angular velocity or constant circumferential velocity. An apparatus 250 for forming a resin layer is arranged downstream with respect to the rotation direction of the can roller 101.

In this example, an apparatus 300 for applying patterning material, which forms insulating regions (margins) is arranged upstream from the apparatus 103 for forming a metal thin film. An apparatus 109 for removing patterning material is arranged between the apparatus 103 for forming a metal thin film and the apparatus 250 for forming a resin layer. An apparatus 106 for curing resin and an apparatus 107 for surface-treating resin are arranged between the apparatus 250 for forming a resin layer and the apparatus 300 for applying patterning material. However, all these devices of course can be arranged as appropriate.

The apparatuses are installed inside a vacuum container 104, wherein a vacuum is maintained with a vacuum pump 105. The vacuum inside the vacuum container 104 is about $2 \times 10^{-4}$ Torr.

The circumferential surface of the can roller 101 is smooth, preferably mirror-finished, and cooled preferably to $-20°$ C. to $40°$ C., more preferably $-10°$ C. to $10°$ C. The rotation velocity can be adjusted freely, but an angular velocity of about 15 to 70 rpm and a circumferential velocity of 20 to 200 m/min are preferable. In this embodiment, a can roller 101 that is a cylindrical drum is used for the rotating supporting base, but a belt-shaped supporting base that runs between two or more rolls, a rotating disk, or other configurations are also possible.

The apparatus 250 for forming a resin layer evaporates or atomizes the resin material for forming the resin layers, and ejects it towards the can roller 101. The resin material is deposited on the circumferential surface of the can roller 101 and forms the resin layer. There are no particular limitations regarding the resin material, as long as it is suitable for forming a film by deposition after being evaporated or atomized. The resin material can be selected in accordance with the application for the layered product, but reactive monomer resins are preferable. For example, if the layered product is used in electronic components, a resin having an acrylate resin or a vinyl resin as its main component is preferable. More specifically, a multifunctional (meth) acrylate monomer, or a multifunctional vinyl ether monomer is preferable. Of these, for example, a cyclopentadiene dimethanoldiacrylate monomer or a cyclohexane dimethanoldivinylether monomer or one of these monomers with substituted hydrocarbon groups are preferable because of their electric properties, thermal resistance and stability. To disperse the resin material, the resin material can be evaporated or atomized with, for example, heating means (such as a heater), ultrasonic waves, or an atomizer. Especially, evaporating the resin material with heating means (such as a heater) is preferable.

Figure 2:
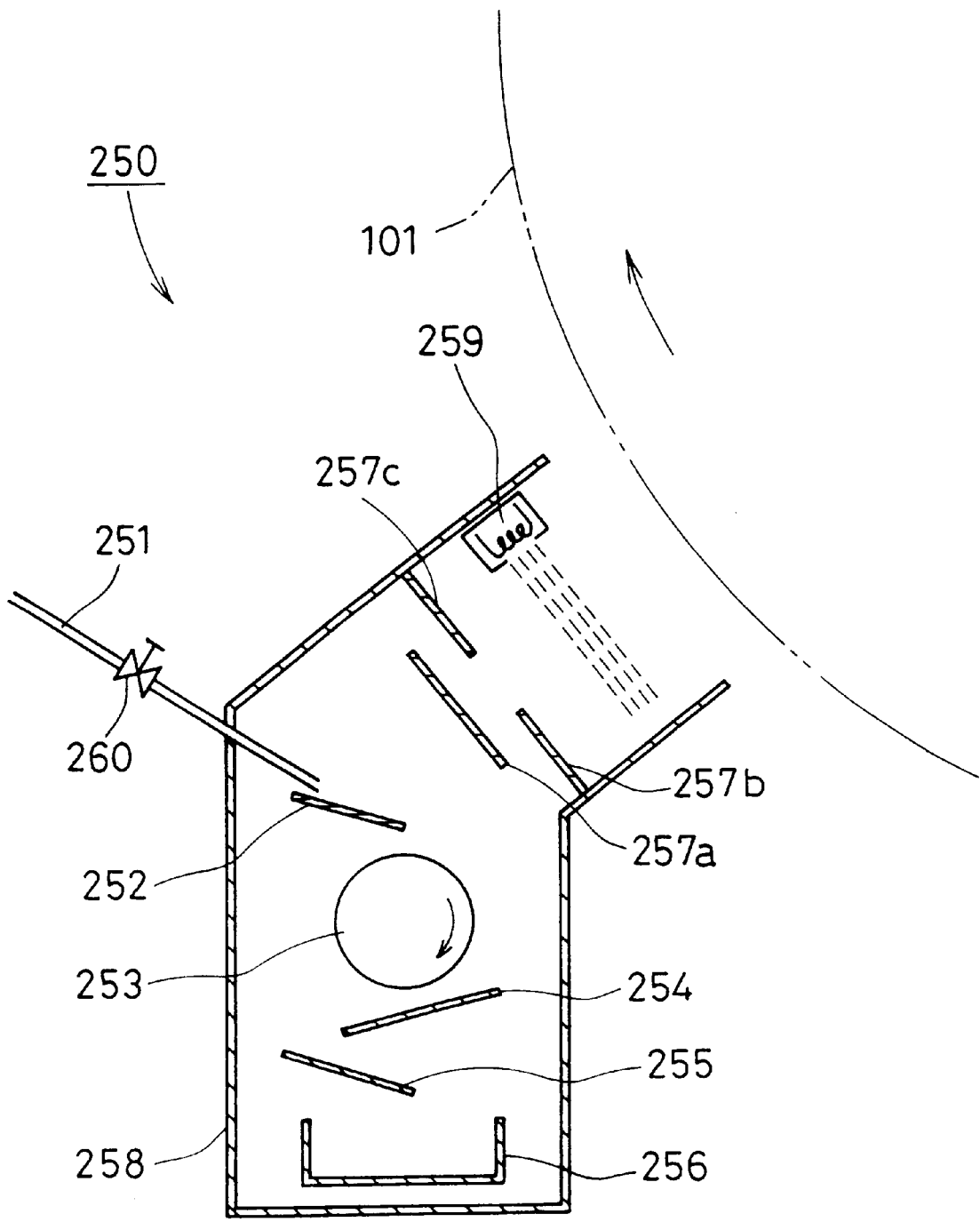
FIG. 2 is a cross-sectional drawing showing the internal structure of the apparatus for forming a resin layer in FIG. 1.

The apparatus 250 for forming a resin layer shown in FIG. 1 is an example of an apparatus for forming a resin layer by heating and evaporating a reactive monomer resin. FIG. 2 is a cross-sectional drawing showing its internal structure.

A liquid reactive monomer for forming the resin layer is introduced through a raw material supply tube 251, and dripped onto an oblique heating plate 252, which is arranged inside the apparatus 250 for forming a resin layer. The fluid flow can be regulated with a fluid-flow regulation valve 260. The reactive monomer is heated while it flows down the heating plate 252. A portion of the reactive monomer evaporates, whereas the portion of the reactive monomer that has not evaporated drops onto the heating drum 253 that rotates at a predetermined rotation velocity. A portion of the reactive monomer on the heating drum 253 evaporates, whereas the portion of the reactive monomer that has not evaporated drops onto a heating plate 254. While the reactive monomer flows down the heating plate 254, a portion of it evaporates, whereas the portion of the reactive monomer that has not evaporated drops onto a heating plate 255. While the reactive monomer flows down the heating plate 255, a portion of it evaporates, whereas the portion of the reactive monomer that has not evaporated drops into a heated cup 256. The reactive monomer inside the cup 256 evaporates gradually. The evaporated reactive monomer rises within the surrounding walls 258, passes between shielding plates 257a, 257b, and 257c, and reaches the circumferential surface of the can roller 101, where it condenses and solidifies to form a resin layer. The means for evaporating the reactive monomer are not limited to the structure described above, and can be modified as appropriate.

Since the evaporated reactive monomer condenses on the can roller 101 to form the resin layer, a resin layer can be obtained that is much thinner and smoother than a resin layer where liquid resin material is applied directly to the can roller 101.

While the evaporated reactive monomer reaches the can roller 101, shielding plates 257a, 257b, and 257c are provided, whereby a resin layer with an even smoother surface can be formed. The reason for this is as follows: The liquid reactive monomer supplied by the raw material supply tube 251 is sometimes heated abruptly by the heating plate 252, so that large particles may develop and scatter. By employing shielding plates that prohibit the reactive monomer from passing straight from the point of evaporation to the point of adherence on the surface of the can roller, the adherence of large particles can be greatly reduced, so that the surface of the resin layer becomes very smooth. Consequently, as long as the shielding plates serve to this end, there is no particular limitation to the shape and arrangement shown in FIG. 2.

Furthermore, in this embodiment, the apparatus 250 for forming a resin layer comprises a device 259 for irradiating a charged particle beam at a passing point of the reactive monomer, which charges the evaporated reactive monomer to achieve a resin layer with a smooth surface. The charged monomer particles are accelerated by electrostatic attraction, and due to the microscopic electrostatic repulsion during the deposition, they avoid the portions where charged particles already were deposited. Due to this mechanism, a very smooth resin film layer can be formed. The device for irradiating a charged particle beam also can be located downstream from the apparatus 109 for removing patterning material and upstream from the apparatus 250 for forming a resin layer, facing the circumferential surface of the can roller 101, where it charges the deposition surface. Depending on the resin material, a device for irradiating a charged particle beam is not in all cases necessary, but especially when using a highly viscous material to achieve a smooth film, the irradiation of charged particles is effective.

It does not matter whether the device for irradiating a charged particle beam confers an electrostatic charge to the reactive monomer particles or to the deposition surface. An electron beam irradiation device, an ion source irradiating an ion beam, or a plasma source can be used as the device for irradiating a charged particle beam.

Since the metal thin film layers of the present invention are very thin, the shape of the underlying layers, whereon the metal thin film layers are formed, is reflected by the surface of the metal thin film layers. It follows that since the surfaces of the resin layers formed as described above are very smooth, the surfaces of the metal thin film layers formed thereon are also very smooth.

The surface roughness of the resin layers can be selected in accordance with the use for the resulting layered product. However, a surface roughness of not more than 0.1 $\mu$m is preferable, a surface roughness of not more than 0.04 $\mu$m is even more preferable, and a surface roughness of not more than 0.02 $\mu$m is most preferable. For the metal thin film layers, a surface roughness of not more than 0.1 $\mu$m is preferable, a surface roughness of not more than 0.04 $\mu$m is even more preferable, and a surface roughness of not more than 0.02 $\mu$m is most preferable. If the surface roughness is larger, no improvement of characteristics of the resultant layered product can be achieved for various applications, and its characteristics become unstable. For example, when applied to a magnetic recording medium, high-density recording becomes difficult, surface protrusions cause dropout, and the reliability of the recording decreases. When applied to electronic components, high-density integration becomes difficult, surface protrusions cause electric field concentrations, and the resin film layer may be leached or the metal thin film layer may be burnt.

It is preferable that the surface roughness of the resin layers is not more than $\frac{1}{10}$, more preferably not more than $\frac{1}{25}$, most preferably not more than $\frac{1}{50}$ of the thickness of the resin layer. If the surface roughness of a resin layer is too large compared with the thickness of the resin layer, electric and magnetic fields may concentrate, and the flatness of the adjacent metal thin film layers may become inferior. Furthermore, it is preferable that the surface roughness of the metal thin film layers is not more than $\frac{1}{10}$, more preferably not more than $\frac{1}{25}$, most preferably not more than $\frac{1}{50}$ of the thickness of the resin layers or the thickness of the metal thin film layers. If the surface roughness of a metal thin film layer is too large compared with the thickness of the resin layers or the thickness of the metal thin film layer, electric and magnetic fields may concentrate, the flatness of the adjacent resin layers may become inferior, or current concentrations may result.

In this specification, "surface roughness" refers to the ten point average roughness Ra, measured with a contact-type surface meter having a diamond needle of 10 $\mu$m tip diameter and a 10 mg measuring load. To measure the surface roughness of a resin layer, the needle was contacted directly with the resin layer surface, and to measure the surface roughness of a metal thin film layer, the needle was contacted directly with the metal thin film layer surface. Of course, the measurements have to be performed while eliminating the influence of all other layering portions (for example, steps due to isolating regions).

If necessary, the deposited resin material can be cured to a predetermined hardness with the apparatus 106 for curing resin. Examples of such a curing process are polymerization and/or crosslinking of the resin material. As the apparatus for curing resin, an electron beam irradiation device, a UV beam irradiation device, or a heat-curing device can be used, for example. The curing degree can vary according to the desired characteristics of the manufactured layered product. For example, if a layered product for an electronic component, such as a capacitor, is manufactured, the resin layer is preferably cured to a curing degree of 50 –95%, more preferably 50–75%. If the curing degree is below these ranges, the layered product that is obtained through the inventive method can be easily deformed by external pressure, which occurs for example when it is installed as an electronic component on a circuit board. This can lead for example to ruptures of the metal thin film layer or to short-circuits. On the other hand, if the curing degree is above the above ranges, the obtained layered product may break when it is taken in its cylindrical shape from the can roller, or subsequently pressed into a flat layered product. To determine the curing degree of the present invention, the ratio of the absorbance of the C=O groups and the C=C groups (1600 cm$^{-1}$) is determined with an infrared spectrophotometer, the ratio of each monomer and the cured product is determined, and the curing degree is defined as 1 minus the reduced absorption ratio.

In the present invention, there is no particular limitation regarding the thickness of the resin layers, but a thickness of not more than 1 $\mu$m is preferable, a thickness of not more than 0.7 $\mu$m is even more preferable, and a thickness of not more than 0.4 $\mu$m is most preferable. To fulfill the need for a layered product that is small yet achieves high performance, it is preferable that the thickness of the resin layers of the layered product obtained with the inventive method is small. For example, if the layered product obtained with the inventive manufacturing method is used as a capacitor, the capacitance of the capacitor increases in inverse proportion to the thickness of its dielectric layer, so that it is preferable that the resin layer serving as the dielectric layer is thin. Not only is the present invention effective for thin layers, its effect is even more conspicuous when the layers are thin.

If necessary, the surface of the formed resin layer is treated with the apparatus 107 for surface-treating resin. For example, the surface of the resin layer can be activated with an oxygen plasma to increase the adhesiveness between the resin layer and the metal thin film layer.

The apparatus 300 for applying patterning material deposits a patterning material in a predetermined shape on the surface of the resin layer. At the portions where the patterning material has been deposited, no metal thin film is formed, so that these portions become insulating regions (margins). In this embodiment, a predetermined number of patternings of a predetermined shape is deposited at predetermined positions in the circumferential direction on the surface of the resin layer formed on the can roller 101.

To apply the patterning material, evaporated patterning material can be ejected from pinholes and condensed on the surface of the resin film layer, or liquid patterning material can be ejected onto the surface of the resin film layer. Besides these examples of contactless application methods, other application methods such as reverse coating or die coating are possible, but for the present invention, contactless application methods are preferable, because they prevent deformations of the resin layer and the metal thin film layer below it due to external pressure on the surface of the resin layer, which may cause rupture of the layers or chapping of the surface.

To apply the patterning material without contact to the surface of the resin layer, evaporated patterning material can be ejected from pinholes and condensed on the surface of the resin film layer, or liquid patterning material can be ejected from pinholes onto the surface of the resin film layer.

Figure 3:
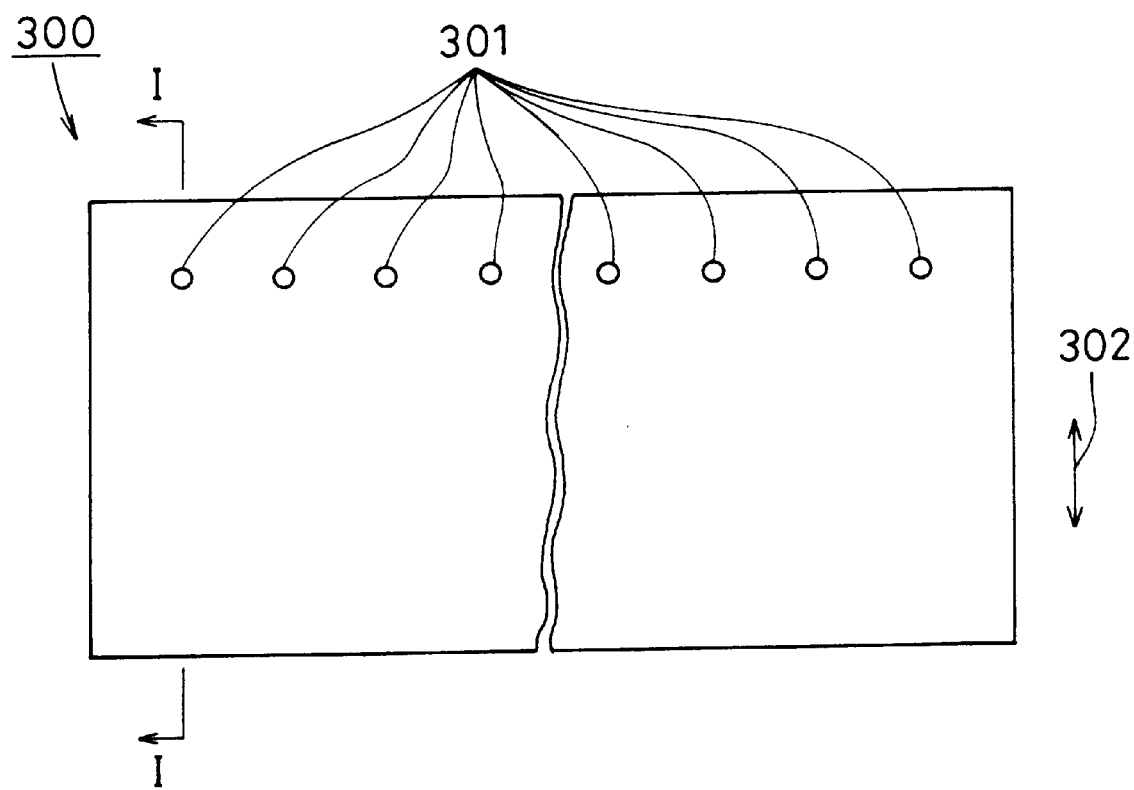
FIG. 3 is a plan view of the apparatus for applying patterning material in FIG. 1.

FIG. 3 is a plan view of the apparatus 300 for applying patterning material used for the manufacturing method of FIG. 1. The apparatus 300 for applying patterning material in FIG. 3 ejects evaporated patterning material from pinholes. The advantages of this apparatus are that it can reliably apply a patterning material with sufficient thickness within a predetermined ranged, and is yet of a relatively simple structure.

On the front of the apparatus 300 for applying patterning material, a row of a predetermined number of pinholes 301 is arranged at predetermined intervals. The apparatus 300 for applying patterning material is arranged in a manner that the pinholes 301 oppose the circumferential surface of the can roller 101, which is the deposition surface, and the direction indicated by arrow 302 matches the travel direction of the deposition surface. Then, the evaporated patterning material is ejected from the pinholes 301 so as to deposit the patterning material on the deposition surface, and condensed by cooling, whereby a deposition film of patterning material is formed. Consequently, the intervals and the number of pinholes 301 in the drawing corresponds to the intervals and numbers of strips of patterning material formed on the surface of the resin layer.

Figure 4:
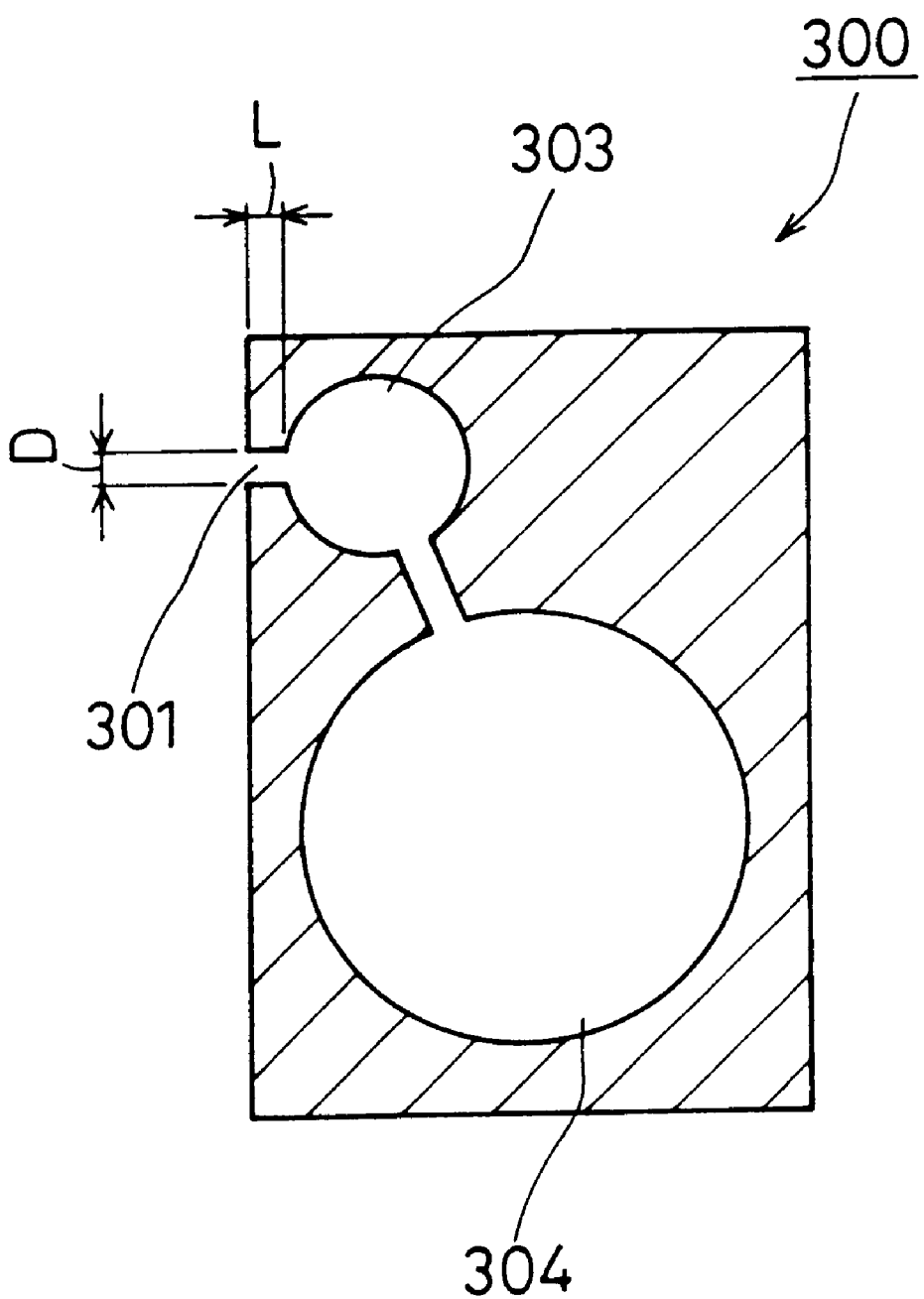
FIG. 4 is a cross-sectional drawing taken along I—I in FIG. 3 seen from the direction of the arrows.

FIG. 4 is a cross-sectional drawing of the apparatus 300 for applying patterning material taken along I—I in FIG. 3, taken from the direction indicated by the arrows. The pinholes 301 are connected to a nozzle 303, which is connected to a container 304. In this example, it is possible to fill the container 304 with patterning material from the outside.

The cross-section of the pinholes 301 can be round (circular), as shown in FIG. 3, but elliptical, elongated, rectangular or other shapes are also possible. If the largest diameter D of the pinholes is 10–500 $\mu$m, preferably 30–100 $\mu$m, patterning material can be applied to suitable thicknesses and a deposition film with distinct borders can be obtained. Furthermore, a plurality of pinholes of the above shapes can be combined to constitute one location for applying patterning material. The shape, size, number and arrangement of the pinholes are selected according to conditions such as the type of patterning material, the deposition width, and the travel velocity of the deposition surface.

When the depth of the pinholes 301 is L, it is preferable that the largest diameter D of the pinholes 301 is selected so that L/D is from 1–10, more preferably 2–8, most preferably 3–7. If L/D is below these ranges, the ejected patterning material scatters over a wide area, and it becomes difficult to obtain a deposition film with a predetemined width and a distinct border. If on the other hand L/D is above these ranges, the directionality with which the patterning material is ejected cannot be improved any further, so that the processing of the pinholes only becomes difficult and costly.

It is preferable that the supply of patterning material to the apparatus 300 for applying patterning material is performed as described in the following.

Figure 5:
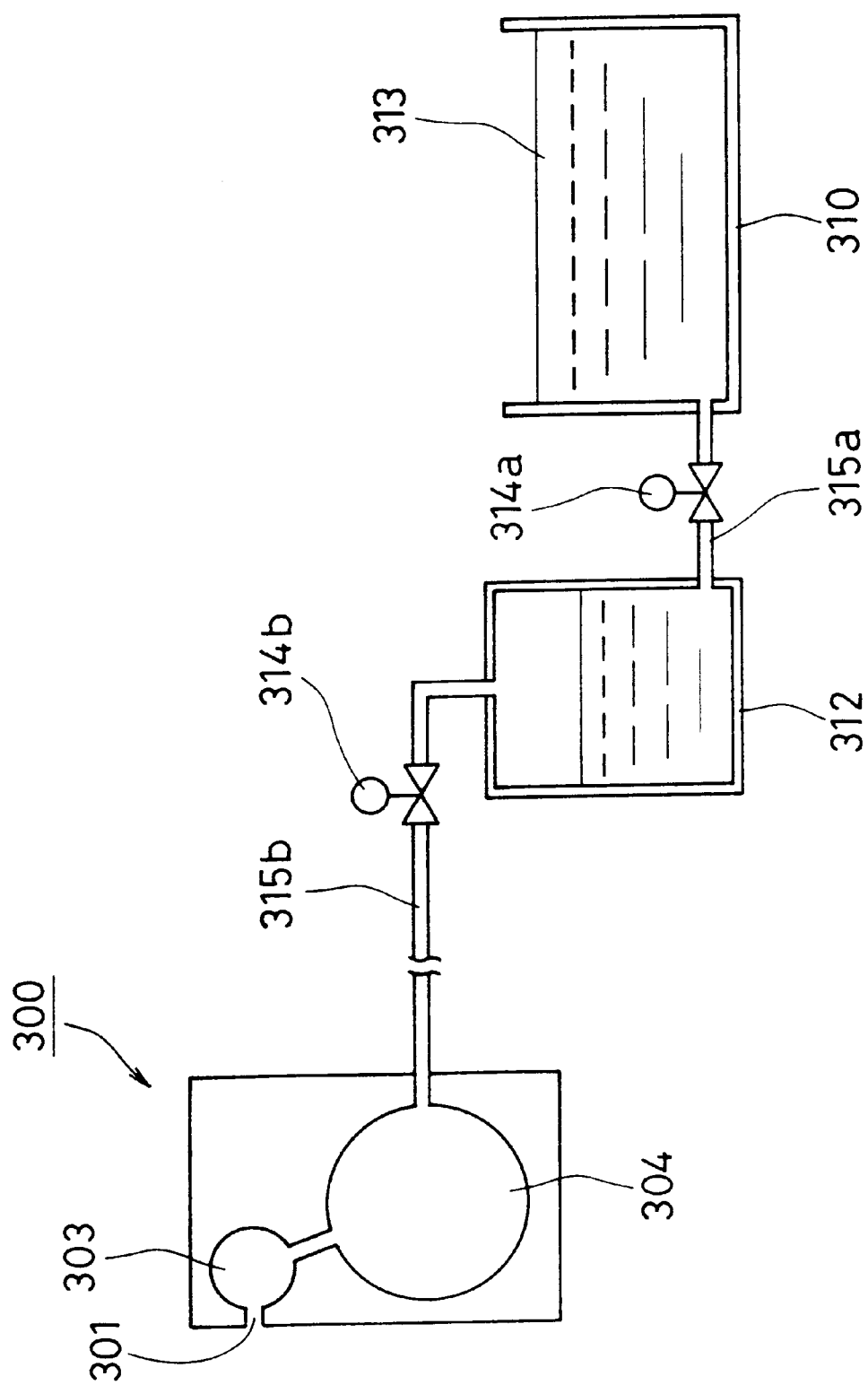
FIG. 5 is a diagram illustrating an example of how evaporated patterning material can be supplied to the apparatus for applying patterning material.

FIG. 5 is a diagram illustrating an example of how evaporated patterning material can be supplied to the apparatus 300 for applying patterning material. Liquid patterning material 313 is accumulated in a reserve tank 310, and supplied to an evaporation device 312 through a pipe duct 315 having a valve 314a. The evaporation device 312 heats and evaporates the patterning material. The evaporated patterning material is transferred to the container 304 of the apparatus 300 for applying patterning material via a pipe duct 315b having a valve 314b. Then the patterning material is ejected towards the deposition surface through the nozzle 303 and the pinholes 301. During the application, the pipe duct 315b and the apparatus 300 for applying patterning material are heated and/or insulated to maintain a predetermined temperature at which the patterning material does not condense. The reserve tank 310 and the evaporation device 312 are set up outside the vacuum container 104 (see FIG. 1). Since the evaporation of patterning material in this example is performed by the evaporation device 312, which is arranged before the apparatus 300 for applying patterning material, the patterning material can be evaporated economically and reliably.

As an alternative to the configuration shown in FIG. 5, it is also possible to transfer liquid patterning material to the container 304 of the apparatus 300 for applying patterning material, and evaporate the patterning material inside the container 304. Moreover, other configurations are possible; for example, a configuration where the apparatus 300 for applying patterning material does not have a container 304, and the gaseous or fluid patterning material is transferred directly to the nozzle 303 of the apparatus 300 for applying patterning material, the fluid patterning material is evaporated in the nozzle, and then ejected from the pinholes 301.

During the evaporation of the patterning material, the portions with low molecular weight tend to evaporate first, so that the components of vapor that evaporate at the beginning of the process may differ from the components of vapor that evaporate towards the end of the process. Consequently, the patterning should be started after the evaporation has stabilized.

The distance Dw between the pinholes of the apparatus 300 for applying patterning material and the deposition surface (resin layer surface) (see FIG. 1) preferably should be not larger than 500 µm, more preferably not larger than 400 µm, most preferably not larger than 300 µm. As a lower limit for this distance, at least 50 µm are preferable, at least 100 µm are even more preferable, and at least 200 µm are most preferable. Thus, when the evaporated patterning material is ejected from the pinholes, it can be scattered while maintaining constant directionality. Consequently, in order to form the deposition film of patterning material reliably with the intended width and with distinct borders, a small distance between the pinholes and the deposition surface is preferable. On the other hand, when the distance between the pinholes and the deposition surface is too small, it becomes difficult to control the thickness of the deposition film, the difference between the thicknesses of the deposition film at a central portion and at a peripheral portion becomes large, and the proportion of vapor that does not adhere and is scattered becomes large.

The following is an explanation of a method for depositing liquid patterning material by ejecting it from pinholes.

Figure 6:
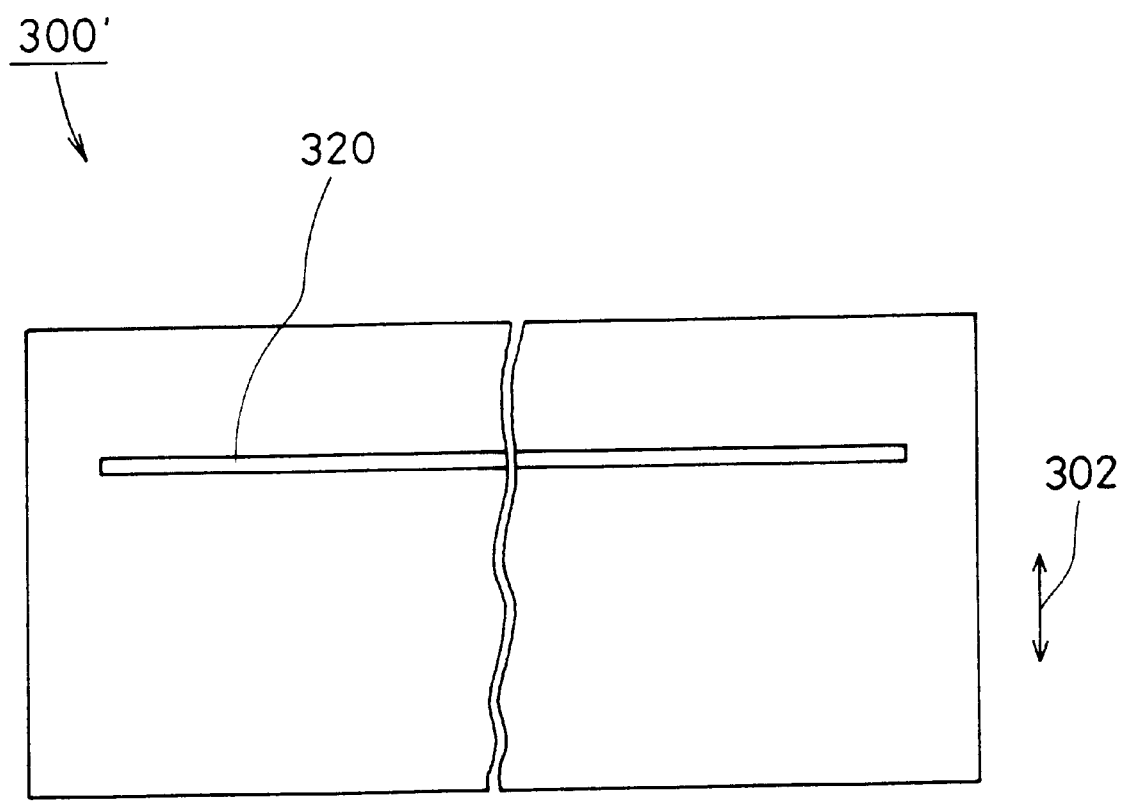
FIG. 6 is a plan view showing an example of an apparatus for applying patterning material that can spray liquid patterning material from pinholes.

FIG. 6 is a plan view showing an example of an apparatus 300' for applying patterning material that can spray liquid patterning material from pinholes. The apparatus 300 for applying patterning material is arranged in a manner that the direction indicated by arrow 302 matches the travel direction of the deposition surface. On the front face of the apparatus 300' for applying patterning material, a nozzle head 320 is arranged at right angles with the arrow direction 302.

Figure 7:
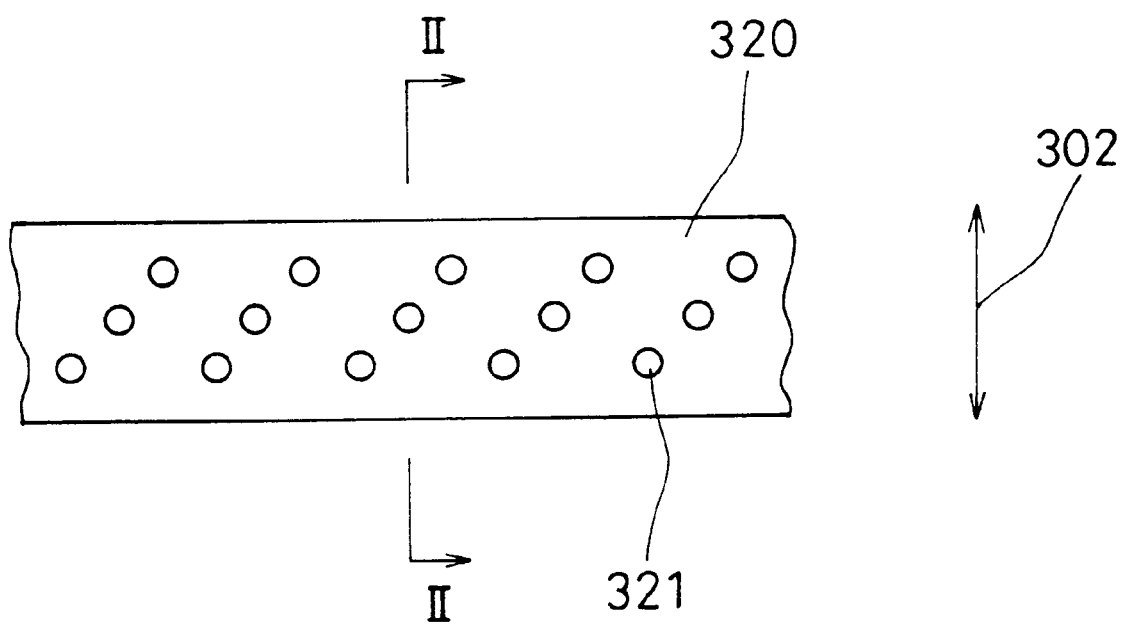
FIG. 7 is an enlarged view showing a portion of the nozzle head of FIG. 6 taken from the front face.

FIG. 7 is an enlarged view showing a portion of the nozzle head 320 of FIG. 6 taken from the front face. In FIG. 7, arrow direction 302 matches arrow direction 302 of FIG. 6. Pinholes 321 are arranged on the surface of the nozzle head. In this example, three pinholes each are arranged at predetermined intervals and at an angle of about 45° with respect to arrow direction 302 to form a pinhole group. A predetermined number of pinhole groups is arranged at predetermined intervals in the nozzle head. Projected onto a plane that is perpendicular to arrow direction 302, the pinholes 321 are arranged at constant intervals. The arrangement of the pinholes is of course not limited to the arrangement shown in FIGS. 6 and 7.

Figure 8:
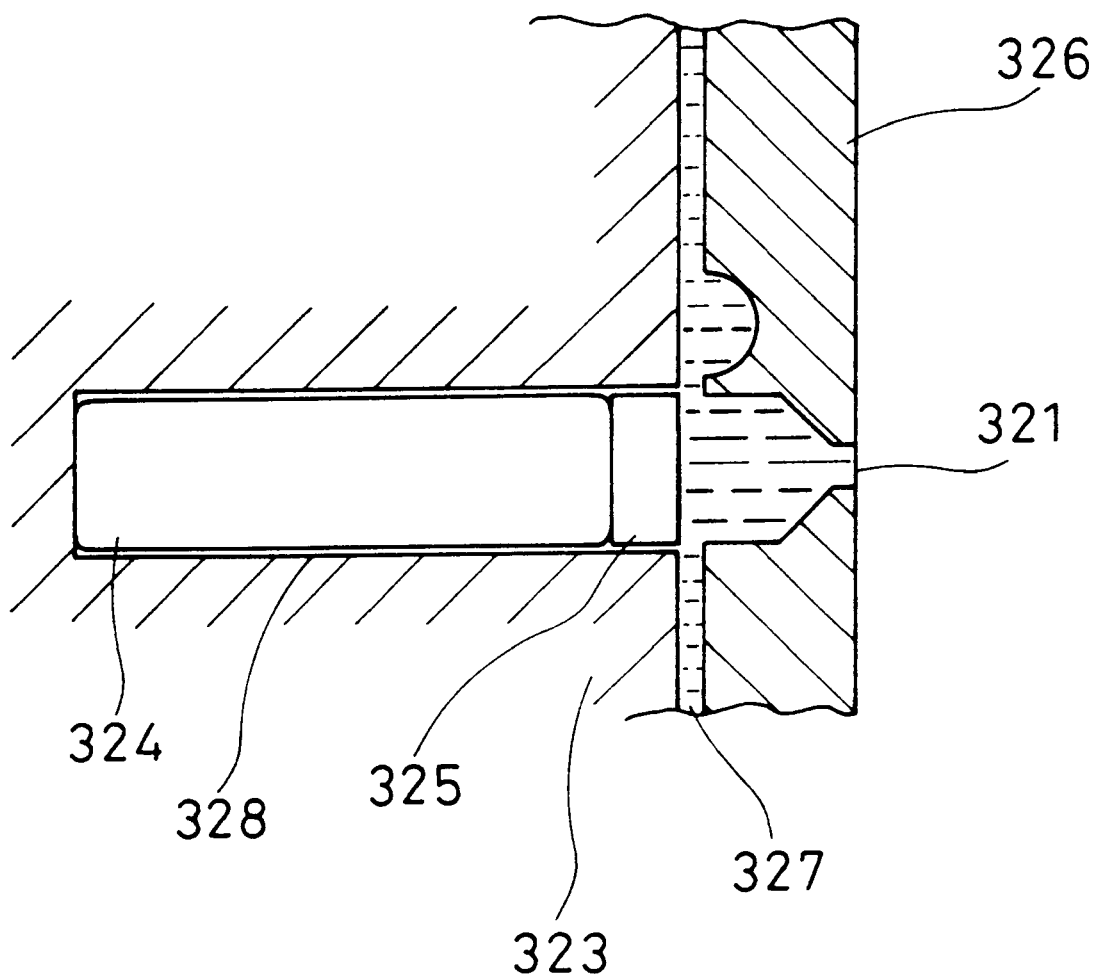
FIG. 8 is a partial cross-sectional drawing showing a pinhole taken along II—II in FIG. 7.

FIG. 8 is a partial cross-sectional drawing showing a pinhole from FIG. 7, taken along II—II in FIG. 7.

A cylinder 328 is cut into a base plate 323, at a portion that corresponds to the position of the pinhole 321. A piezoelectric element 324 and a piston head 325 are inserted in that order into the cylinder 328. An orifice plate 326 is arranged at the front face of the base plate 323. Liquid patterning material 327 can be filled between the orifice plate 326 and the base plate 323. The diameter of the pinhole 321 can be designed as appropriate, and can be for example about 70 µm.

The spraying of the liquid patterning material from the pinhole 321 is performed as follows. The piezoelectric effect causes the piezoelectric element 324 to contract, and the piston head 325 is retracted to the left in FIG. 8. Thus, a negative pressure develops at the front face of the piston head 325, and patterning material 327 is sucked into the cylinder 328. Then, by restoring the piezoelectric element to its original position, the patterning material that has accumulated in the cylinder 328 is ejected through the pinhole 321. With this method, the patterning material is ejected dropwise, that is, discontinuously. Consequently, the patterning material that is ejected in a single ejection adheres as one dot on the deposition surface (that is, on the surface of the resin layer). By adjusting the ejection amount (that is, the drop size) and the ejection intervals of the patterning material per ejection, the patterning material can be applied as a continuous liquid film.

With this method, patterning material can be ejected from an array of freely selectable pinholes that are arranged perpendicularly to the travel direction of the deposition surface (that is, the surface of the resin layer). Thus, the region to which patterning material is applied can be easily modified. In addition, ejection from each pinhole easily can be started and stopped, which makes it easy to apply patterning material also in other shapes than stripes (for example, discontinuous shapes). Furthermore, compared to the method of condensing the ejected evaporated patterning material on the deposition surface as described above, the directionality of the ejected patterning material is sharper, and it is easier to apply the patterning material precisely in the desired way. What is more, since the distance between the pinholes and the deposition surface can be larger (for example, about 500 µm), the design restrictions are more relaxed, and precise control of the retraction of the apparatus for applying patterning material (described below) can be simplified.

In this method, it is preferable to charge the droplet particles of the ejected patterning material electrically, and to form an electric field in the space into which they are ejected. If the direction of the electric field is matched with the direction in which the pinholes oppose the deposition surface, the droplet particles of patterning material are accelerated towards the deposition surface. Therefore, the directionality of the ejected patterning particles becomes even sharper, and the distance between the pinholes and the deposition surface can be even larger. If the direction of the electric field points into another direction, the trajectory of the droplet particles can be bent into an arbitrary direction. Thus, the design restrictions for the device can be further relaxed. To charge the droplet particles, ionization methods such as electron beam irradiation, ion irradiation, or plasmas can be used for example.

In the inventive method for manufacturing a layered product, a predetermined number of resin layers and metal thin film layers are formed on a rotating supporting base. If a patterning material is applied, it has to be applied every time immediately before forming the metal thin film layer. Consequently, if the number of layers is large, the distance between the pinholes and the deposition surface (that is, the surface of the resin layer) becomes gradually smaller. Therefore, it is preferable that the apparatus 300 for applying patterning material can be retracted in accordance with the progression of the deposition, so as to keep the distance between the pinholes and the deposition surface within the above-mentioned ranges.

Figure 9:
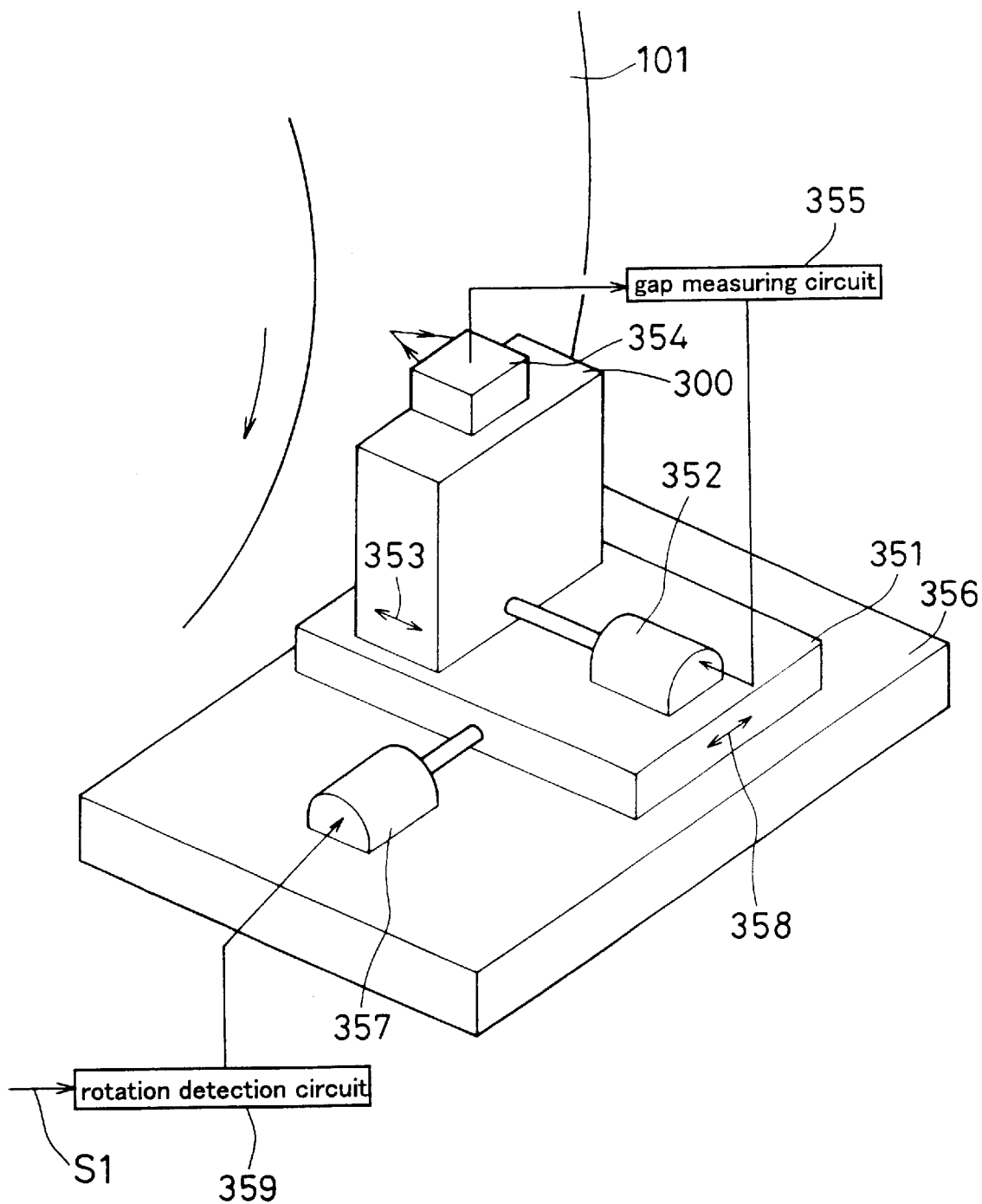
FIG. 9 is a diagram showing an example of a device for retracting the apparatus for applying a patterning material and moving the application position for patterning material.

The apparatus 300 for applying patterning material can be retracted for example by the apparatus shown in FIG. 9: An actuator 352 is fixed on a movable base 351. The apparatus 300 for applying patterning material is attached to the mobile terminal of the actuator 352. The actuator 352 can move the apparatus 300 for applying patterning material in the direction of arrow 353 on the movable base 351. A gap measuring device 354 for measuring the distance to the surface of the can roller 101 (or the circumferential surface of the layered product during the formation of layers) is arranged on the apparatus 300 for applying patterning material. A contactless measuring device, for example a measuring device using a laser, can be used for the gap measuring device 354. During the manufacturing of the layered product, the gap measuring device 354 keeps measuring the distance to the circumferential surface of the layered product on the surface of the can roller 101, and a signal corresponding to this measurement is sent to a gap measuring circuit 355. The gap measuring circuit 355 continuously checks whether the distance between the pinholes of the apparatus 300 for applying patterning material and the surface of the can roller 101 (or the circumferential surface of the layered product during the formation of layers) is within a predetermined range. When the deposition progresses and the gap measuring circuit 355 determines that this distance is smaller than the predetermined range, it instructs the actuator 352 to retract the apparatus 300 for applying patterning material a predetermined distance, and based on this instruction, the apparatus 300 for applying patterning material is retracted a predetermined distance. Thus, the distance Dw between the pinholes of the apparatus 300 for applying patterning material and the circumferential surface of the layered product on the can roller 101 can always be kept within a constant interval while the deposition progresses.

As an alternative to the control using the gap measuring device 354 and the gap measuring circuit 355 as explained above, the apparatus 300 for applying patterning material also can be retracted for a preset length that is based on the layering thickness, in accordance with the number of rotations of the can roller 101 (for example, per rotation).

Moreover, a fine-tuning mechanism of verifying the actual distance with the gap measuring device 354 described above can be added to this configuration In the manufacturing method of the present invention, it is preferable that the position where the patterning material is applied can be modified appropriately during the manufacture of the layered product. For example, each predetermined number of rotations of the supporting base, the application position of the patterning material may be shifted a predetermined distance in a direction perpendicular to the travel direction of the deposition surface and within a plane that is parallel to the deposition surface. Thus, a layered product can be obtained wherein resin layers and metal thin film layers are successively layered, and wherein the position of the isolating regions (margins) on the layered product varies for each layer. Thus, if the layered product is used as an electronic component for example, metal thin film layers sandwiching a resin film can be provided easily as electrodes with different potential.

Changes in the position where patterning material is applied can be realized with the device shown in FIG. 9. An actuator 357 is attached to a support base 356. The movable base 351 is attached to the mobile terminal of the actuator 357. The actuator 357 can move the movable base 351 on the support base 356 in the direction indicated by arrow 358. The rotation of the can roller 101 is observed by a rotation detector (not shown in the drawing), which sends a rotation signal $S_1$ to a rotation detection circuit 359 whenever the can roller 101 has rotated one turn. When the rotation detection circuit 359 has counted a predetermined number of rotations (for example one rotation), it instructs the actuator 357 to move the movable base 351 for a predetermined distance in a predetermined direction as indicated by arrow 358. Thereby, the movable base 351, and thus the apparatus 300 for applying patterning material, is moved a predetermined distance in a predetermined direction as indicated by arrow 358. Thus, the position where patterning material is applied can be changed each predetermined number of rotations of the can roller 101 for a predetermined distance in a direction that is perpendicular to the travel direction of the surface of the can roller 101.

It is preferable that the patterning material comprises at least one oil of the group consisting of ester oils, glycol oils, fluorocarbon oils, and hydrocarbon oils. It is even more preferable that the patterning material is an ester oil, a glycol oil, or a fluorine oil. It is most preferable that the patterning material is a fluorine oil.

The patterning material has to be able to withstand the thermal load during the formation of the metal thin film, and ensure that no metal thin film is formed at the region where patterning material has been applied. However, in addition to that, in the present invention, it has to be a material that can be applied contactless in its gaseous or liquid state on a resin layer surface. Furthermore, it has to be a material that does not clog the pinholes of the apparatus for applying a patterning material. It has to be compatible with the resin layer formed with the inventive method, and in some cases, it has to have a certain wettability. In some cases, it has to be removable by heat or decomposition in a vacuum. Since such special conditions are added, it is preferable that the patterning material used in the present invention is an oil that is especially adapted to these conditions. When other materials than the above patterning materials are used, the surface of the layered product may be chapped, pinholes may appear in the resin layers or the metal thin film layers, or other problems such as unsteady deposition of the metal thin film layer may occur.

If evaporated patterning material is ejected with the pinholes, it is preferable that its vapor pressure becomes 0.1 Torr at a temperatures of 80 to 250° C. With a patterning material that does not satisfy this condition, the above-mentioned problems may occur. Moreover, it is preferable that the average molecular weight of the oil is 200–3000, more preferably 300–3000, most preferably 350–2000. If the average molecular weight is larger than these ranges, the pinholes tend to clog. If on the other hand the average molecular weight is smaller than these ranges, the margins may not be sufficiently formed.

The apparatus 103 for forming a metal thin film layer forms a metal thin film layer after depositing the patterning material where appropriate. The metal thin film can be formed by vapor deposition, sputtering, ion plating or other well-known methods. For the present invention however, vapor deposition, especially electron beam vapor deposition, is preferable, because with this method, a film with excellent moisture resistance can be obtained with high productivity. Moreover, with electron beam vapor deposition, the electron beam also can be used for electron beam irradiation onto the belt-shaped object described below. Possible materials for the metal thin film layer include aluminum, copper, zinc, nickel, iron, cobalt, silicon, germanium, their compounds, their oxides, and the oxides of their compounds. Of these, aluminum is preferable, because of its adhesiveness and low cost. The metal thin film layer also can include other components.

The apparatus 103 for forming a metal thin film layer of the present embodiment is maintained under a stronger vacuum by partition walls 110 and 111 provided inside the vacuum container 104. To stop the formation of the metal thin film layer, a shielding plate 112 that can be moved from the outside is provided between the apparatus 103 for forming a metal thin film and the can roller 101. With the manufacturing method of the present invention, a layered product can be manufactured that has alternating resin layers and metal thin film layers, but using the shielding plate 112, it is also possible to make a layered product that has regions where resin layers are formed continuously.

The thickness of the metal thin film layer can be selected according to the application for the layered product obtained with the inventive manufacturing method. If the layered product is used for an electronic component, it is preferable that the thickness of the metal thin film layer is not more than 50 nm, more preferably 10–50 nm, most preferably 20–40 nm. Moreover, it is preferable that the film resistance is not more than $20\Omega/\square$, more preferably not more than $15\Omega/\square$, even more preferably $1$–$10\Omega/\square$, and most preferably $3$–$10\Omega/\square$.

Moreover, if the layered product is used for an electronic component, especially a capacitor, it is preferable that the ratio of (resin layer thickness)/(metal thin film layer thickness) is not more than 20, more preferably not more than 15, because this improves the property of self-healing when opposing metal thin film layers are electrically shorted by, for example, a pin-hole in a resin layer. The self-healing eradicates defects by eliminating or leaching the metal thin film layer through the resulting overcurrent.

It is preferable that residual patterning material is removed after the metal thin film layer has been formed and before the resin layer is deposited. Most of the patterning material that has been deposited with the apparatus for applying a patterning material is removed by being again evaporated when the metal thin film layer is formed. However, a portion remains even after the formation of the metal thin film layer, and can contribute to a number of problems, such as chapping the deposited surface, causing pinholes (lack of deposition) in the resin layer or the metal thin film layer, or instabilities in the regions where the metal thin film layer is deposited.

The removal of the patterning material is performed by an apparatus 109 for removing patterning material, which is installed between the apparatus 103 for forming a metal thin film and the apparatus 250 for forming a resin layer. There is no particular limitation regarding how the patterning material is removed, and an appropriate method can be selected in accordance with the patterning material type. The patterning material can be removed by heat and/or decomposition, for example. Examples of how the patterning material can be removed by heat include irradiation of light or use of an electric heater. Devices for irradiation of light can be simple and remove the patterning material efficiently. Here, "light" includes far infrared and infrared rays. Examples of how the patterning material can be removed by decomposition, on the other hand, include plasma irradiation, ion irradiation, and electric beam irradiation. For the plasma irradiation, for example oxide plasmas, argon plasmas, or nitrogen plasmas can be used, and among these, oxide plasmas are especially preferable.

Using the above-described apparatus, a layered product comprising resin layers and metal thin film layers can be manufactured on a rotating support base. In the method for manufacturing a layered product according to the present invention, a belt-shaped object is run over the supporting base, and removed before the resin layer and the metal thin film layer are deposited on the supporting base.

It is preferable that a resin film, a fabric, or a paper is used for the belt-shaped object. With a resin film, the effect of the present invention as described below becomes the most apparent; it is easy to handle, does not inflict any damage on the surface of the can roller 101, and is also comparably inexpensive. Especially polyester films, and within these, polyethyleneterephthalate or polyethylenenaphthalate are preferable, because of their heat-resistance, electric isolation, mechanical strength, handling properties, and comparably low cost.

FIG. 1 shows the stage before the layered product is produced. A resin film 220 that has been rolled onto an unwinding roll 221 is set to be rolled onto a winding roll 222 over a guide roll 223, the can roller 101, and a guide roll 224 in that order.

The removal of foreign particles adhering to the circumferential surface of the can roller 101, which is a first object of the present invention, is achieved as follows:

The unwinding roll 221, the can roller 101, and the winding roll 222 in FIG. 1 are rotated in the directions indicated by the arrows 225, 102, and 225 respectively, and the resin film 220 travels along the can roller 101 When the resin film contacts the can roller 101, it is electrostatically charged due to how it was manufactured and due to its travelling over the can roller 101 Thus, foreign particles adhering to the circumferential surface of the can roller 101 attach to the resin film 220 due to electrostatic attraction and are thereby removed. Moreover, the tensional force when the resin film runs along the can roller 101 causes it to contact the surface of the can roller with a constant pressure, so that foreign particles adhering to the circumferential surface of the can roller 101 bulge into the surface of the resin film, which has a low surface hardness, mechanically attach to the film, and are thus removed from the circumferential surface of the can roller 101

Furthermore, an electron beam irradiation device facing the circumferential surface of the can roller 101 is turned on and irradiates an electron beam onto the resin film 220, thereby charging the resin film 220. Since this increased electrostatic attraction lets the foreign particles adhering to the circumferential surface of the can roller 101 attach more firmly to the resin film 220, foreign particles can be removed even better. To increase the removal of foreign particles by electrostatic attraction, it is preferable that the resin film has a volume resistivity of at least $10^{10}$ Ω·m, even more preferably at least $10^{12}$ Ω·m.

In case that electron beam vapor deposition is used for the apparatus 103 for forming a metal thin film, and if the electron beam is irradiated onto the resin film, the same effect is achieved, even if there is no separate electron beam irradiation device 108 as in FIG. 1.

Moreover, it is preferable that the travel velocity of the resin film during irradiation of the electron beam is lower than the regular travel velocity of the circumferential surface of the can roller 101 during manufacture of the layered product. This is because by rolling the resin film slowly, the charge on the resin film increases, so that foreign particles can be removed better. Furthermore, the amount of film that is necessary for the removal of foreign particles can be reduced.

It is preferable that during the removal of foreign particles, the shielding plate 112 of the apparatus 103 for forming a metal thin film, the fluid-flow regulation valve 260 of the apparatus 250 for forming a resin layer, and the valve 314*b* of the apparatus 300 for applying patterning material are closed. This ensures the charging of the resin film 200 and raises the efficiency with which foreign particles are removed. However, it is preferable that these devices are in standby while foreign particles are removed, so that the manufacture of the layered product can be initiated as soon as this step is finished, just by opening the valves 260 and 314*b*, and time losses are reduced.

A resin layer, a metal thin film layer, and if necessary an insulating region can be formed as a trial on the surface of the travelling resin film, and their formation can be checked before the layered product is manufactured, which is a second object of the present invention.

If a foreign particle removal step has been performed before that, first, the travel velocity of the resin film is matched with the regular travel velocity of the circumferential surface of the can roller 101 during the manufacture of the layered product. This has to be done, because the object of this step is to check the formation of the layers before forming them.

The check of the metal thin film layer is performed by opening the shielding plate 112 of the apparatus 103 for forming a metal thin film, and forming a metal thin film layer on the surface of the travelling resin film 220. The thickness of the resulting metal thin film layer is measured, while the resin film 220 is travelling, with a thickness gauge 227 measuring the amount of transmitted light placed between, for example, the guide roll 224 and the winding roll 222. If the actual thickness differs from the desired thickness, the settings for the apparatus 103 for forming a metal thin film are changed until the desired thickness is attained.

It is preferable that the fluid-flow regulation valve 260 of the apparatus 250 for forming a resin layer and the valve 314*b* of the apparatus 300 for applying patterning material are closed during the check of the metal thin film layer, because the thickness measurement of the metal thin film layer with the thickness gauge 227 becomes imprecise if they are open.

The check of the insulating region (margin) is performed by starting the apparatus 300 for applying patterning material, depositing patterning material on the surface of the travelling resin film 220, and then forming a metal thin film layer with the apparatus 103 for forming a metal thin film. How well the insulating region has been formed is determined by scanning the film with the thickness gauge 227 in the film's cross direction, and determining the change of transmitted light and the corresponding shift of the thickness gauge 227. Alternatively, an image recognition device can be set near the metal thin film layer and determine by image recognition how well the insulating region has been formed.

If the insulating region has not been formed as desired (with respect to, for example, position of the insulating region, width, contrast of the border portions), the apparatus 300 for applying patterning material is moved in the cross direction of the resin film or in a radial direction of the can roller 101, or the deposition amount of patterning material is adjusted, until the desired insulating region is obtained.

It is preferable that the fluid-flow regulation valve 260 of the apparatus 250 for forming a resin layer is closed during the check of the metal thin film layer, because the check of the insulating region becomes imprecise if a resin layer is deposited on the metal thin film layer.

The check of the resin layer is performed by running the apparatus 250 for forming a resin layer, and forming a resin layer on the surface of the travelling resin film 220. The thickness of the resulting resin layer is measured, while the resin film 220 is travelling, with a colorimeter 200 placed, for example, downstream next to the apparatus 250 for forming a resin layer. If the actual thickness of the resin layer differs from the desired thickness, the settings for the apparatus 250 for forming a resin layer are changed until the desired thickness is attained.

After the resin layer has been formed, it can be cured to a desired hardness with an apparatus 106 for curing resin. If in that case the colorimeter 200 is placed downstream from the apparatus 106 for curing resin, the thickness of the hardened resin layer can be measured, and a verification can be performed that is even closer to the conditions under which the layered product is manufactured.

It is preferable that the resin layer is checked after opening the shielding plate 112 of the apparatus 103 for forming a metal thin film and forming a metal thin film layer, and forming the resin layer on top thereof. This approximates the conditions to the conditions for manufacturing the layered product and provides for an even more precise check. However, in this case, care has to be taken since there is a possibility that, depending on the measurement principle, the thickness of the resin layer is measured together with the thickness of the metal thin film layer.

The valve 314*b* of the apparatus 300 for applying patterning material can be open or closed. However, if it is closed, the influence of the remaining patterning material can be ignored. On the other hand, it is also possible to leave the valve 314*b* open, and deposit the resin layer while running the apparatus 109 for removing patterning material. Thereby it is possible to check the operation of the apparatus 109 for removing patterning material.

There is no particular restriction concerning the steps of removing foreign particles, validating the metal thin film layer, validating the insulating region, and validating the resin layer, and their order can be adjusted as is appropriate for the actual operation.

After the above steps are finished, a layered product is manufactured directly on the circumferential surface of the can roller 101, and it becomes necessary to remove the travelling resin film.

The removal of the resin film 220 in the apparatus of FIG. 1 is performed with a cutter blade 226 while the resin film 220 is running. If the resin film 220 is severed while it is running, it is not necessary to stop the can roller 101, nor is it necessary to open the vacuum container 104, so that there is no change in the environmental conditions in the vacuum container 104 and the optimized settings for each device can be maintained as the optimal settings for the following processes. Also, new foreign particles cannot adhere to the circumferential surface of the can roller 101 Furthermore, after the above processes have been finished, the manufacturing of the layered product can be begun without delay.

If the travel velocity of the resin film 220 is slowed down for severing the resin film while it is running, the resin film can be cut without difficulties. The method for severing the resin film is not limited to using the cutting blade 226, and can be selected in accordance with the type of belt-shaped object used. Other possible methods include for example thermal cutting by heat.

According to the manufacturing method of the present invention, forming a resin layer by depositing resin material and forming a metal thin film layer are performed one after the other, and repeated a predetermined number of times on a rotating supporting base, whereby a layered product comprising resin layers and metal thin film layers is manufactured, but it is also possible to omit one or more of these forming steps at the beginning, at the end or in between, so that metal thin film layer or resin layers are formed continuously. Furthermore, it is also possible to include a step of forming a layer other than a resin layer or a metal thin film layer at the beginning, at the end or in between these forming steps.

EXAMPLES

The following are non-limiting examples that illustrate the configuration and the effect of the present invention in more detail.

Example 1

According to this example, a layered product for a capacitor was manufactured using the apparatus in FIG. 1.

First, the vacuum container 104 was opened, and a resin film 220 that has been wound onto the unwinding roll 221 was set so as to unwind over the guide roll 223, the can roller 101, and the guide roll 224 onto the winding roll 222. For the resin film 220, a biaxially stretched polyethyleneterephthalate film of 6 $\mu$m thickness and $10^{15}$ $\Omega$·m volume resistivity was used. Then, the vacuum container 104 was closed, and evacuated to $2\times10^{-}$ Torr with the vacuum pump 105. The circumferential surface of the can roller 101 was cooled to 5° C., and maintained at this temperature. The diameter of the can roller 101 was 500 mm.

Then, the unwinding roll 221, the can roller 101, and the winding roll 222 were rotated in the directions indicated by arrows 225, 102, and 225, respectively, whereby the resin film 220 was unwound.

While unwinding the film, first, foreign particles were removed. Using the electron beam irradiation device 108 which was placed so as to face the periphery of the can roller 101, an electron beam was irradiated onto the travelling resin film 220 to charge the resin film 220. This was performed for about 10 min with a travel velocity of the film of 5 m/min. During that time, the shielding plate 112 of the apparatus 103 for forming a metal thin film, the fluid-flow regulation valve 260 of the apparatus 250 for forming a resin layer, and the valve 314b of the apparatus 300 for applying patterning material were closed, but all were in standby, so that they could be immediately started.

Then, the metal thin film layer was checked as follows. The travel velocity of the film was increased to 50 m/min, which is the same as the travel velocity of the circumferential surface of the can roller 101 when manufacturing the layered product. Then, the shielding plate 112 of the apparatus 103 for forming a metal thin film, which was kept in stand-by, was opened, and a metal thin film layer of aluminum was formed on the surface of the travelling resin film 220. The thickness of the resulting metal thin film layer was measured with the thickness gauge 227 while the resin film 220 was running. Then, the settings for the apparatus 103 for forming a metal thin film were optimized while the resin film 220 was still running, until the thickness of the metal thin film layer became a desired 300 Å. During this time, the fluid-flow regulation valve 260 of the apparatus 250 for forming a resin layer, and the valve 314b of the apparatus 300 for applying patterning material were kept closed.

After the settings for the apparatus 103 for forming a metal thin film were adjusted, the insulating region was checked. The valve 314b of the apparatus 300 for applying patterning material was opened, and patterning material was deposited onto the surface of the travelling resin film 220. Then, a metal thin film layer was formed with the apparatus 103 for forming a metal thin film.

For the patterning material, the same fluorine oil was used, that was also used for the subsequent production of the layered product. The temperature at which the vapor pressure of the patterning material becomes 0.1 Torr is 10° C. The average molecular weight of the oil is 1500.

The patterning material was supplied as shown in FIG. 5. After the patterning material was pre-evaporated in the evaporation device 312, it was fed to the apparatus 300 for applying patterning material. For the apparatus 300 for applying patterning material, a device as shown in FIGS. 3 and 4 was used, having round (circular) pinholes of 75 $\mu$m diameter, 500 $\mu$m depth from which the evaporated patterning material was ejected.

How well the insulating region was formed was determined by scanning the film with the thickness gauge 227 in the film's cross direction, and determining the change of transmitted light and the corresponding shift of the thickness gauge 227. The apparatus 300 for applying patterning material was moved in the cross direction of the resin film or in a radial direction of the can roller 101, or the deposition amount of patterning material was adjusted, until the width of the resulting insulating region was a desired 150 $\mu$m. The optimum conditions obtained thereby were a retention temperature of 170° for the apparatus 300 for applying patterning material and a distance Dw of 250–300 $\mu$m between the pinholes 301 of the apparatus 300 for applying patterning material and the deposition surface.

During this time, the fluid-flow regulation valve 260 of the apparatus 250 for forming a resin layer was closed.

Then, the resin layer was checked. The apparatus 250 for forming a resin layer in FIGS. 1 and 2 was started, and a resin layer was formed on top of the metal thin film layer formed on the travelling resin film 220. For the resin layer raw material, dicyclopentadienedimethanoldiacrylate was used. The thickness of the resin layer was measured with a colorimeter 200 downstream of the apparatus 250 for forming a resin layer, while the resin film 220 was running. The settings for the apparatus 250 for forming a resin layer were adjusted until the measured thickness was 0.4 μm if the resin layer was used as a dielectric layer (element layer) in a capacitor, or 0.6 μm if the resin layer was used as a reinforcement layer adjacent to an element layer (see below for details), and the optimum settings for these two thicknesses were determined.

After these procedures were finished, the shielding plate 112 of the apparatus 103 for forming a metal thin film, the fluid-flow regulation valve 260 of the apparatus 250 for forming a resin layer, and the valve 314b of the apparatus 300 for applying patterning material were closed, and put in stand-by.

Then, while the resin film 220 was still running, the resin film 220 was cut with a cutter blade 226, and after it was confirmed through a peephole (not shown in the drawing) of the vacuum container 104 that the severed resin film 220 has been completely wound onto the winding roll 222, the unwinding roll 221, the winding roll 222, and the guide roll 223 and 224 were stopped.

Subsequently, the manufacturing of a layered product for a capacitor was started.

First of all, the fluid-flow regulation valve 260 of the apparatus 250 for forming a resin layer was opened, and a protective layer was deposited on the circumferential surface of the can roller 101

The protective layer consists only of a resin layer and does not contribute to the capacitance of the capacitor. For the layered product or for the process of manufacturing a capacitor using the same or for the process of mounting the capacitor on a printed circuit board, the function of this protective layer is to prevent the dielectric layers (element layers) from being damaged by heat or external pressure. Also regarding an increased adhesion strength with the external electrodes, the protective layer displays a certain effect, although not as much as a metal thin film layer.

For the protective layer, the same material as for the resin layers was used, namely dicyclopentadienedimethanoldiacrylate, which was evaporated and deposited on the circumferential surface of the can roller 101 with the apparatus 250 for forming a resin layer. The settings for forming the protective layer were the optimum settings that were determined for a reinforcement resin layer when checking the resin layer. For the apparatus 106 for curing resin, a UV curing device was used, which polymerized and cured the deposited protective layer. This operation was repeated by rotating the can roller 101, and a protective layer of 15 μm thickness was formed on the circumferential surface of the can roller 101.

Then, a reinforcement layer was deposited.

For the layered product, for the process of manufacturing a capacitor using the same, or for the process of mounting the capacitor on a printed circuit board, the function of this protective layer is to prevent the dielectric layers (element layers) from being damaged by heat or external pressure. The reinforcement layer comprises a resin layer and, if necessary, a metal thin film layer. By having a metal thin film layer, the adhesion strength of the external electrodes can be increased. That is to say, the adhesion strength of the external electrodes is mainly affected by the strength of the connection with the metal thin film layer, whereas the strength of the connection with the resin layer contributes only little to the adhesion strength. Consequently, by providing a reinforcement layer comprising a metal thin film layer, the adhesion strength of the external electrode of the capacitor can be significantly increased. In the case of a capacitor, the reinforcement layer also can function as a dielectric layer of the capacitor, but in this example, it does not function as a dielectric layer, which simplifies the capacitor design.

For the resin film of the reinforcement layer, the same material as for the protective layer was used. The reinforcement layer material was evaporated and deposited by the apparatus 250 for forming a resin layer on top of the protective layer. The settings for forming the reinforcement layer were the optimum settings that were determined for a reinforcement resin layer when checking the resin layer. For the apparatus 106 for curing resin, a UV curing device was used, which polymerized and cured the deposited reinforcement layer to a curing degree of 70%. Then, the surface of the reinforcement layer was treated with an oxygen plasma using the apparatus 107 for surface-treating resin. Subsequently, the valve 314b of the apparatus 300 for applying patterning material was opened, and a stripe of patterning material was deposited. The conditions for this deposition were the optimum conditions determined when the insulating region was checked.

Then, aluminum was vapor-deposited with the apparatus 103 for forming a metal thin film. The conditions for this deposition were the optimum conditions determined when the metal thin film was checked. Then, residual patterning material was removed with the apparatus 109 for removing patterning material, with heat from a far infrared heater and a plasma discharge process.

This procedure was repeated by rotating the can roller 101 a total of 500 revolutions, thereby forming a reinforcement layer of a total thickness of 315 μm. Shifts of the apparatus 300 for applying patterning material in a direction perpendicular to the travel direction of the circumferential surface of the can roller 101 (indicated by arrow 358 in FIG. 9) were performed with the device shown in FIG. 9, according to the following pattern: After one revolution of the can roller 101, the apparatus 300 for applying patterning material was shifted 60 μm in a first direction; after the next revolution, it was shifted 60 μm in the same first direction; after the next revolution, it was shifted 60 μm in a second direction opposite to the first direction; and after the next revolution, it was shifted 60 μm in the same second direction. These shifts constitute one cycle, which was repeated thereafter. Moreover, the distance Dw between the pinholes of the apparatus for applying a patterning material and the deposition surface was kept between 250 and 300 μm.

Then, portions of the element layer that form dielectric layer portions of the capacitor were deposited. For the resin layer (dielectric layer), the same material as for the protective layer and the reinforcement layer was used. The resin layer material was evaporated and deposited on top of the reinforcement layer. The settings for forming this resin layer were the optimum settings that were determined for an element resin layer when checking the resin layer. For the apparatus 106 for curing resin, a UV curing device was used, which polymerized and cured the deposited resin layer material to a curing degree of 70%. Thereupon, the surface was treated with an oxygen plasma using the apparatus 107 for surface-treating resin. After that, patterning material was deposited in stripe-shape with the apparatus 300 for applying patterning material. The settings for this deposition were the optimum settings that were determined when checking the insulating region.

Then, aluminum was vapor-deposited with the apparatus 103 for forming a metal thin film. The conditions for this deposition were the optimum conditions determined when the metal thin film was checked. Then, residual patterning material was removed with the apparatus 109 for removing patterning material, with heat from an infrared heater and a plasma discharge process.

This procedure was repeated by rotating the can roller 101 a total of about 2000 revolutions, thereby forming an element layer portion of a total thickness of 860 μm. Shifts of the apparatus 300 for applying patterning material in a direction perpendicular to the travel direction of the circumferential surface of the can roller 101 (direction indicated by arrow 358 in FIG. 9) were performed with the device shown in FIG. 9, according to the following pattern: After one revolution of the can roller 101, the apparatus 300 for applying patterning material was shifted 1000 μm into a first direction; after the next revolution, it was shifted 940 μm in a second direction opposite to the first direction; after the next revolution, it was shifted 1000 μm in the first direction; after the next revolution, it was shifted 940 μm in the second direction; after the next revolution, it was shifted 1000 μm in the first direction; after the next revolution, it was shifted 1060 μm in the second direction; after the next revolution, it was shifted 1000 μm in the first direction; and after the next revolution, it was shifted 1060 μm in the second direction. These shifts constitute one cycle, which was repeated thereafter. Moreover, the distance Dw between the pinholes of the apparatus for applying a patterning material and the deposition surface was kept between 250 and 300 μm.

Then, a 315 μm thick reinforcement layer was formed on the surface of the element layer. This reinforcement layer was formed by exactly the same process as the previously mentioned reinforcement layer.

Finally, a protective layer of 15 μm thickness is formed on the surface of the reinforcement layer. This protective layer was formed by exactly the same process as the previously mentioned protective layer.

Figure 10:
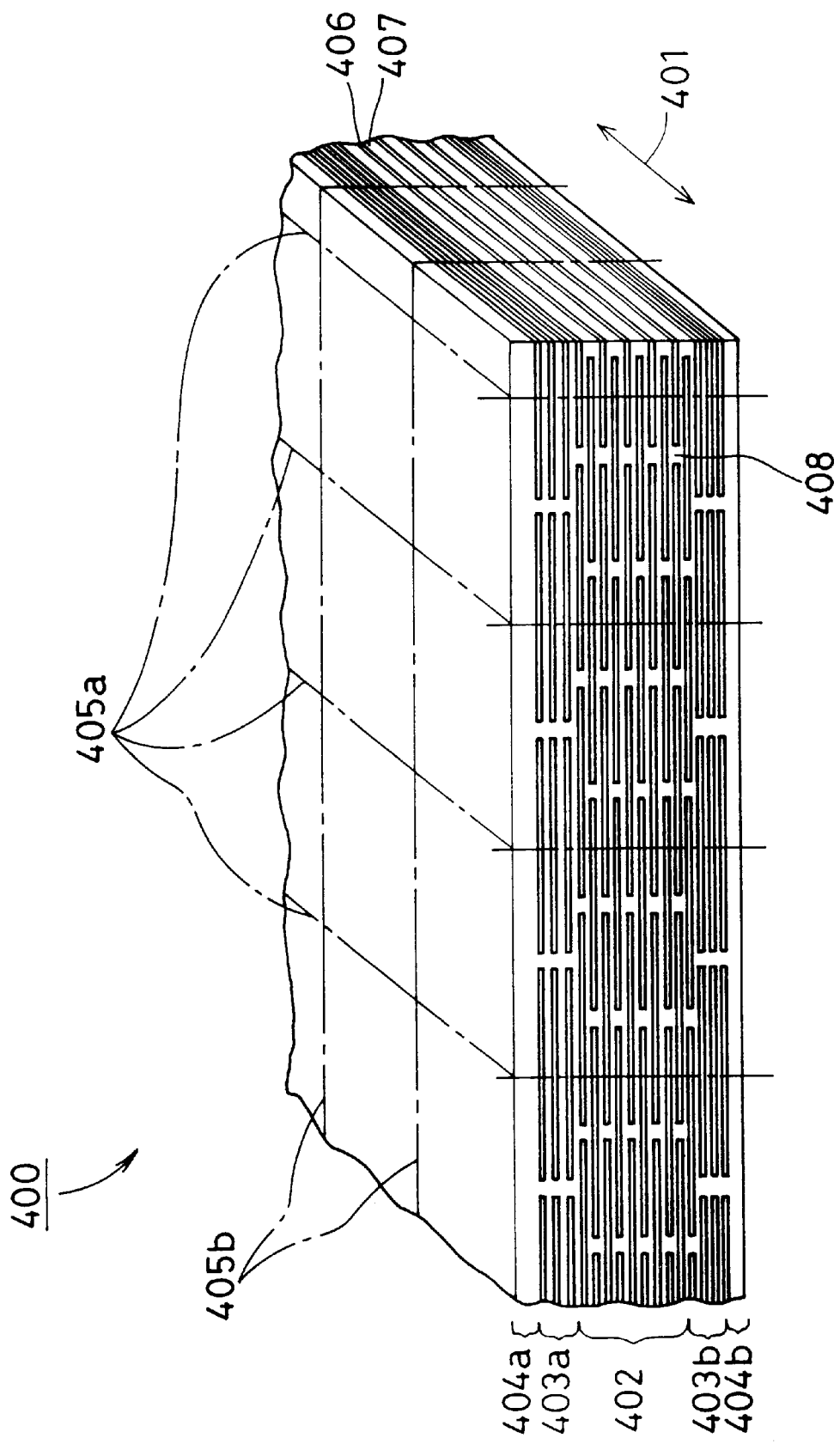
FIG. 10 is a partial perspective view illustrating a flat layered base element obtained in Example 1.

Then, the cylindrical layered product on the circumferential surface of the can roller 101 was cut in radial direction into 8 sections (separated by 45°) and dismantled from the can roller 101. The sections were pressed under heat, and flat layered base elements 400 as shown in FIG. 10 were obtained. In this figure, arrow 401 indicates the travel direction of the circumferential surface of the can roller 101 The layered base elements 400 comprise, in order starting at the side of the can roller 101 (i.e., on the bottom of FIG. 10), a protective layer 404*b,* a reinforcement layer 403*b,* an element layer 402, a reinforcement layer 403*a,* and a protective layer 404*a.* In FIG. 10, numeral 406 denotes metal thin film layers, numeral 407 denotes resin layer, and numeral 408 denotes insulating regions (margins). The layering in FIG. 10 is only illustrated in a schematic manner; the number of layers is much lower than the actual number of layers. Moreover, the insulating regions 408 in the element layer 402 are slightly shifted in the direction of the layer thickness, but this shift has been omitted from the drawing.

Figure 11:
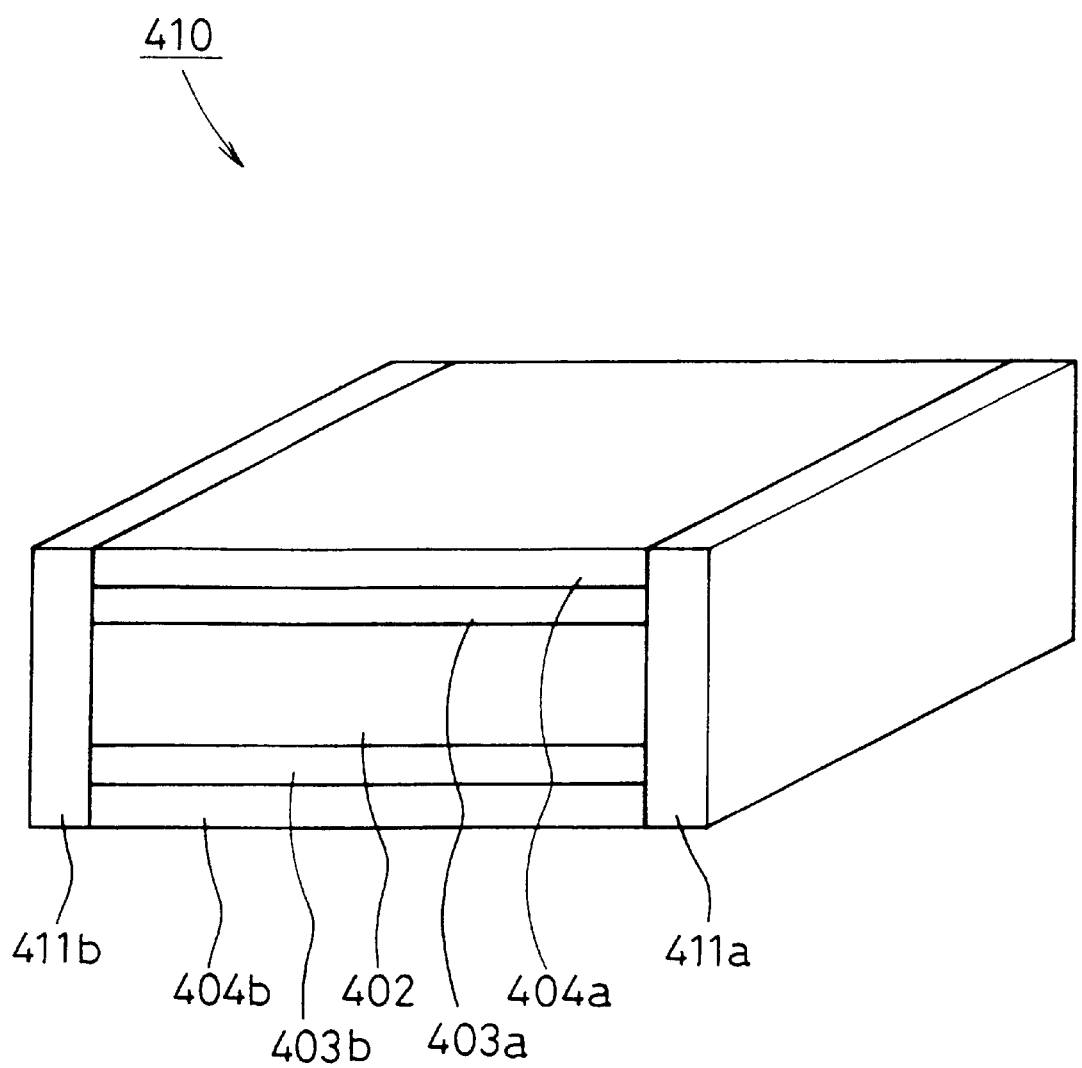
FIG. 11 is a perspective view illustrating a chip capacitor obtained in Example 1.
Figure 12:
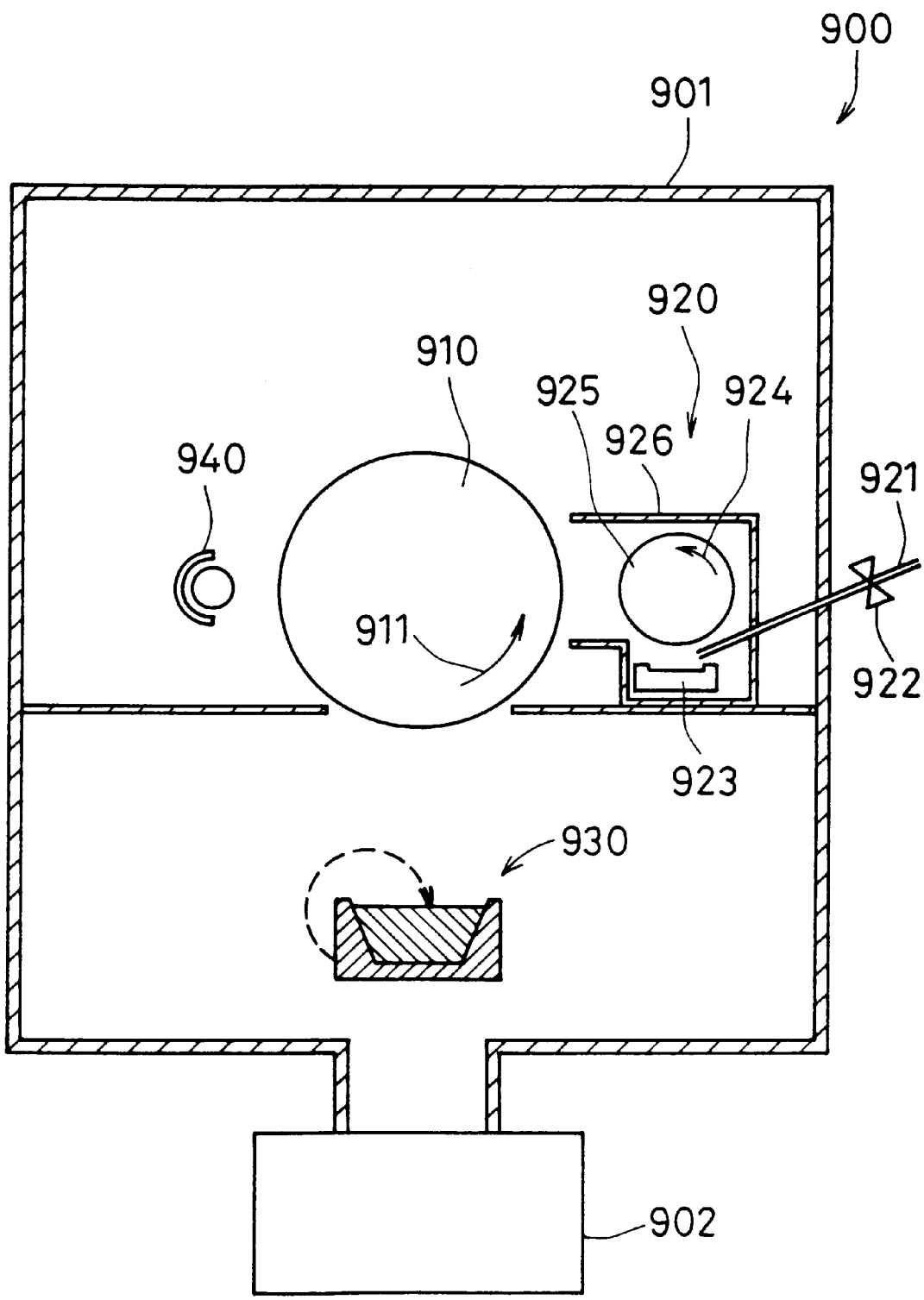
FIG. 12 is a cross-sectional drawing schematically showing an example of a manufacturing apparatus for performing a conventional method for manufacturing a layered product.
Figure 13:
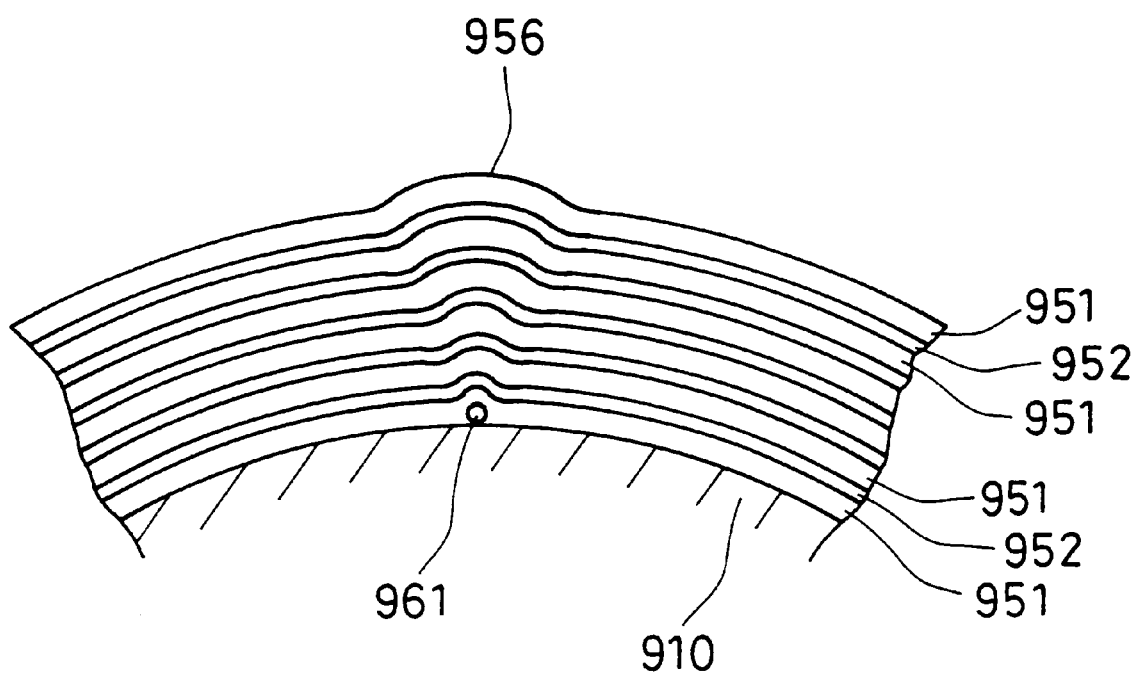
FIG. 13 is a cross-sectional drawing, showing schematically the layering of resin layers and metal thin film layers when a solid foreign particle adheres to the surface of the can roller.

Then, the flat layered base elements 400 were cut along the cutting planes 405*a,* and the cutting planes were metallized with brass so as to form external electrodes. An electrically conducting paste, consisting of a heat-curing phenol resin whereinto an alloy of copper, nickel, and silver has been dispersed, was applied to the metallized surface, heat-cured, and the resulting resin surface was plated with molten solder. After that, the pieces were cut along the cutting planes 405*b* in FIG. 10, and immersed into a silane coupling agent to coat the circumferential surface, whereby chip capacitors 410 as shown in FIG. 11 were obtained. Numerals 411*a* and 411*b* in FIG. 11 denote the external electrodes.

The resulting chip capacitor was small, with a thickness in the layering direction of about 1.5 mm, a depth of about 1.6 mm, and a width (in the direction between the two external electrodes) of about 3.2 mm, and had a capacitance of about 0.47 μF. Its withstand voltage was 50V. Moreover, its insulation resistance at 16V dc applied voltage was $10^{11}\Omega$. Shorts between metal thin film layers or ruptures in the metal thin film layers could not be discerned.

When the chip capacitor was taken apart and the surface roughness Ra of the dielectric layers and the metal thin film layers in the element layer portion was measured, they were both 0.005 μm, that is, smooth with no discernible rough protrusions.

The thickness of each resin layer of the element layer was 0.4 μm, and the thickness of each resin layer of the reinforcement layer was 0.6 μm. The thickness of these layers was as designed, and there were also no variations in the layering direction. Moreover, the hardness of the resin layers (dielectric layers) of the element layer was 95%, the hardness of the resin layers of the reinforcement layer 95%, and the hardness of the protective layer was 90%.

The thickness of the metal thin film layer in the reinforcement layer and the element layer was 300 Å, as designed, the film resistance was 6Ω/□, and there were almost no thickness variations in the layering direction.

Furthermore, in the element layer portion, the width of the portion of the metal thin film layer where no metal thin film is deposited was 150 μm, and in the reinforcement layer, the width of the portion of the metal thin film layer where no metal thin film is deposited was 150 μm, i.e. a margin with a constant width could be formed as originally designed.

Comparative Example 1

As a comparative example, a capacitor was manufactured with the same method as in Example 1, except that foreign particles were not removed.

That is to say, as in Example 1, a biaxially stretched polyethylene terephthalate film was set, the vacuum container closed and evacuated, and the travel velocity of the film was set to the same velocity as the travel velocity of the circumferential surface of the can roller 101 during manufacture of the layered product, i.e. 50 m/min. Then, as in Example 1, formation of the metal thin film layer, the insulating region, the resin layer were checked in that order, the film was cut, and a layered product was produced.

The resulting chip capacitor was small, with a thickness in the layering direction of about 1.5 mm, a depth of about 1.6 mm, and a width (in the direction between the two external electrodes) of about 3.2 mm, and had a capacitance of about 0.47 μF. Its withstand voltage was 35V. Moreover, its insulation resistance at 16V dc applied voltage was $10^9\Omega$, worse than the insulation resistance of the capacitor obtained in Example 1.

When the chip capacitor was taken apart and the surfaces of the dielectric layers and the metal thin film layers in the element layer portion were examined, many large protrusions could be observed, whereas the regions without these protrusions were smooth. When the surface roughness Ra of the dielectric layers and the metal thin film layers in the element layer portion was measured, they were both 0.02 μm, that is, larger than in Example 1.

The thickness of each resin layer of the element layer was 0.4 μm, and the thickness of each resin layer of the reinforcement layer was 0.6 μm. The thickness of these layers was as designed, and there were also no variations in the layering direction. Moreover, the hardness of the resin layers (dielectric layers) of the element layer was 95%, the hardness of the resin layers of the reinforcement layer 95%, and the hardness of the protective layer was 90%.

The thickness of the metal thin film layer in the reinforcement layer and the element layer was 300 Å, as designed, the film resistance was 6Ω/□, and there were almost no thickness variations in the layering direction.

Furthermore, in the element layer portion, the width of the portion of the metal thin film layer where no metal thin film is deposited was 150 μm, and in the reinforcement layer, the width of the portion of the metal thin film layer where no metal thin film is deposited was 150 μm, i.e. a margin with a constant width could be formed as originally designed.

Comparative Example 2

As a comparative example, a capacitor was manufactured with the same method as in Example 1, except that the formation of the metal thin film layer, the insulating region, and the resin layer was not checked.

That is to say, as in Example 1, a biaxially stretched polyethylene terephthalate film was set up, the vacuum container closed and evacuated, and the travel velocity of the film was set at 5 m/min. Then, an electron beam was irradiated for about ten minutes onto the running resin film 220 with the electron beam irradiation device 108.

Then, the film was cut, the travel velocity of the circumferential surface of the can roller 101 was increased to 50 m/min, and a layered product was manufactured with the same method as in Example 1. The settings for forming the resin layers and the metal thin film layers, and the settings for depositing patterning material were taken from theoretically calculated settings and from past settings.

The resulting chip capacitor had a thickness in the layering direction of about 1.5 mm, a depth of about 1.6 mm, and a width (in the direction between the two external electrodes) of about 3.2 mm, and had a capacitance of about 0.42 μF. Its withstand voltage was 40V. Although shorts between metal thin film layers or ruptures in the metal thin film layers could not be observed, there was a deviation of 10% from the designed capacitance (of 0.47 μF) and of 20% from the designed withstand voltage (of 50V).

When the chip capacitor was taken apart and the surface roughness Ra of the dielectric layers and the metal thin film layers in the element layer portion was measured, they were both 0.005 μm, that is, smooth with no discernible rough protrusions.

The thickness of each resin layer of the element layer was 0.45 μm, and the thickness of each resin layer of the reinforcement layer was 0.65 μm. The thickness of these layers thus deviated 10% each from the design values (0.4 μm for the element layer; 0.6 μm for the reinforcement layer). Moreover, the hardness of the resin layers (dielectric layers) of the element layer was 95%, the hardness of the resin layers of the reinforcement layer 95%, and the hardness of the protective layer was 90%.

The thickness of the metal thin film layer in the reinforcement layer and the element layer was 250 Å, and the film resistance was 8Ω/□, deviating 20% and 30% respectively from the design values (300 Å for the thickness; 8Ω/□ for the film resistance).

Furthermore, in the element layer portion, the width of the portion of the metal thin film layer where no metal thin film is deposited was 180 μm, and in the reinforcement layer, the width of the portion of the metal thin film layer where no metal thin film is deposited was 180 μm, both widths deviating 20% from the design values (150 μm for the element layer portion; 150 μm for the reinforcement layer portion), and unclear margin contours could be found here and there.

Table 1 illustrates which processes were performed in Example 1 and the Comparative Examples 1 and 2. Table 2 illustrates the design values in comparison with the actually achieved results of Example 1 and the Comparative Examples 1 and 2.

TABLE 1

|  | Example 1 | Comp. Ex. 1 | Comp. Ex. 2 |
| --- | --- | --- | --- |
| removal of foreign particles | Y | N | Y |
| check of metal thin film layer | Y | Y | N |
| check of insulating region | Y | Y | N |
| check of resin layer | Y | Y | N |

TABLE 2

|  | Design Value | Example 1 | Comp. Ex. 1 | Comp. Ex. 2 |
| --- | --- | --- | --- | --- |
| Capacitor |  |  |  |  |
| thickness (mm) | 1.5 | 1.5 | 1.5 | 1.5 |
| depth (mm) | 1.6 | 1.6 | 1.6 | 1.6 |
| width (mm) | 3.2 | 3.2 | 3.2 | 3.2 |
| capacitance (μF) | 0.47 | 0.47 | 0.47 | 0.42 (−10%) |
| withstand volt. (V) | 50 | 50 | 35 (−30%) | 40 (−20%) |
| insulat. resistance (Ω) | — | $10^{11}$ | $10^9$ | $10^{11}$ |
| Element Layer surface roughness Ra (μm) |  |  |  |  |
| resin layer | — | 0.005 | 0.02 | 0.005 |
| metal thin film layer thickness | — | 0.005 | 0.02 | 0.005 |
| resin layer (μm) | 0.4 | 0.4 | 0.4 | 0.45 (+10%) |
| metal thin film layer (Å) | 300 | 300 | 300 | 250 (−20%) |
| film resistance (Ω/□) | 6 | 6 | 6 | 8 (+30%) |
| width of non-metal portion (mm) | 150 | 150 | 150 | 180 (+20%) |
| Reinforcement Layer thickness |  |  |  |  |
| resin layer (μm) | 0.6 | 0.6 | 0.6 | 0.65 (+10%) |
| metal thin film layer (Å) | 300 | 300 | 300 | 250 (−20%) |
| film resistance (Ω/□) | 6 | 6 | 6 | 8 (+30%) |
| width of non-metal portion (mm) | 150 | 150 | 150 | 180 (+20%) |

(Figures in parentheses indicate the deviation from the design value)

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for manufacturing a layered product, comprising the steps of: forming a resin layer by deposition of a resin material; forming a metal-containing thin film layer; which steps are repeated a predetermined number of times on a rotating supporting base, so as to manufacture a layered product comprising resin layers and metal-containing thin film layers directly on said supporting base; and before the resin layers and metal-containing thin film layers are formed on the supporting base: running a belt-shaped object over the supporting base; and removing the belt-shaped object from the supporting base.

2. The method according to claim 1, wherein the belt-shaped object is a resin film.

3. The method according to claim 1, wherein the belt-shaped object is a film made of polyethylene terephthalate or polyethylene naphthalate.

4. The method according to claim 1, wherein the volume resistivity of the belt-shaped object is at least $10^{10}$ Ω·m.

5. The method according to claim 1, further comprising irradiating an electron beam onto the belt-shaped object while the belt-shaped object is running.

6. The method according to claim 5, further comprising setting a travel velocity of the belt-shaped object during the electron beam irradiation to a velocity that is lower than a travel velocity of a surface of the supporting base during the manufacture of the layered product.

7. The method according to claim 1, further comprising forming a metal-containing thin film layer onto the running belt-shaped object.

8. The method according to claim 7, further comprising, while the belt-shaped object is running, measuring the thickness of the metal-containing thin film layer formed on the running belt-shaped object.

9. The method according to claim 7, further comprising applying patterning material to the belt-shaped object before forming the metal-containing thin film layer.

10. The method according to claim 9, further comprising, while the belt-shaped object is running, measuring a region where the metal-containing thin film layer has not been formed due to the application of the patterning material.

11. The method according to claim 9, wherein the patterning material is applied in a contactless manner.

12. The method according to claim 9, wherein an adhesion position of the patterning material on a deposition surface is changed while adhering the patterning material.

13. The method according to claim 9, wherein the patterning material comprises at least one oil of the group consisting of ester oils, glycol oils, fluorine oils, and hydrocarbon oils.

14. The method according to claim 7, wherein the metal-containing thin film layer comprises at least one substance selected from the group consisting of aluminum, copper, zinc, nickel, iron, cobalt, silicon, germanium, their compounds, their oxides, and the oxides of their compounds.

15. The method according to claim 1, further comprising forming a resin layer by depositing resin material onto the running belt-shaped object.

16. The method according to claim 15, further comprising, while the belt-shaped object is running, measuring the thickness of the resin layer formed on the running belt-shaped object.

17. The method according to claim 1, wherein the belt-shaped object is removed by severing the belt-shaped object while the belt-shaped object is running.

18. The method according to claim 1, wherein running the belt-shaped object over the supporting base and manufacturing the layered product are performed in a vacuum.

19. The method according to claim 1, wherein the rotating supporting base is cylindrical.

20. The method according to claim 1, wherein the resin material is a reactive monomer resin.

21. The method according to claim 1, further comprising curing the resin material, after the resin material has been deposited.

22. The method according to claim 21, wherein the resin material is cured by at least one of the processes selected from the group consisting of polymerization and cross-linking.

23. The method according to claim 21, wherein the resin material is cured until it reaches a cure extent of 50–95%.

24. The method according to claim 1, wherein a thickness of the resin layer is not more than 1 μm.

25. The method according to claim 1, wherein a thickness of the resin layer is not more than 0.7 μm.

26. The method according to claim 1, wherein a surface roughness of the resin layer is not more than 0.1 μm.

27. The method according to claim 1, wherein the metal-containing thin film layer is formed by vapor deposition.

28. The method according to claim 27, wherein the vapor deposition is electron beam vapor deposition.

29. The method according to claim 1, wherein the metal-containing thin film layer comprises at least one substance selected from the group consisting of aluminum, copper, zinc, nickel, iron, cobalt, silicon, germanium, their compounds, their oxides, and the oxides of their compounds.

30. The method according to claim 1, wherein a thickness of the metal-containing thin film layer is not more than 50 nm.

31. The method according to claim 1, wherein a film resistivity of the metal-containing thin film layer is not more than 20 Ω/□.

32. The method according to claim 1, wherein a surface roughness of the metal-containing thin film layer is not more than 0.1 μm.

33. The method according to claim 1, wherein (thickness of the resin layer) (thickness of the metal-containing thin film layer)≦20.

34. The method according to claim 1, wherein the steps that are repeated a predetermined number of times further comprise applying patterning material subsequent to forming a resin layer and prior to forming a metal-containing thin film layer.

35. The method according to claim 34, wherein applying the patterning material comprises ejecting evaporated patterning material from pinholes opposing a deposition surface; and condensing the patterning material on the deposition surface.

36. The method according to claim 34, wherein applying the patterning material comprises ejecting liquid patterning material from pinholes opposing a deposition surface; and applying the patterning material to the deposition surface.

37. The method according to claim 34, further comprising removing residual patterning material subsequent to forming a metal-containing thin film layer and prior to forming a resin layer.

38. The method according to claim 34, wherein the steps that are repeated a predetermined number of times further comprise surface-treating a surface of the resin layer subsequent to forming a resin layer and prior to applying patterning material.

39. The method according to claim 34, wherein an adhesion position of the patterning material on a deposition surface is changed while adhering the patterning material.

* * * * *